United States Patent
Nguyen et al.

(10) Patent No.: US 9,751,614 B1
(45) Date of Patent: Sep. 5, 2017

(54) AEROELASTIC WING SHAPING USING DISTRIBUTED PROPULSION

(71) Applicant: The United States of America as Represented by the Administrator of the National Aeronautics and Space Administration, Washington, DC (US)

(72) Inventors: Nhan T. Nguyen, Santa Clara, CA (US); Kevin Wayne Reynolds, Menlo Park, CA (US); Eric B. Ting, Moffett Field, CA (US)

(73) Assignee: The United States of America as Represented by the Administrator of NASA, Washington, DC (US)

( * ) Notice: Subject to any disclaimer, the term of this patent is extended or adjusted under 35 U.S.C. 154(b) by 0 days.

(21) Appl. No.: 14/986,011

(22) Filed: Dec. 31, 2015

Related U.S. Application Data

(60) Provisional application No. 62/119,013, filed on Feb. 20, 2015.

(51) Int. Cl.
| | | |
|---|---|---|
| *B64C 3/52* | (2006.01) | |
| *B64C 3/10* | (2006.01) | |
| *B64C 3/32* | (2006.01) | |
| *B64C 15/02* | (2006.01) | |
| *B64D 27/24* | (2006.01) | |
| *B64C 9/00* | (2006.01) | |

(52) U.S. Cl.
CPC .......... *B64C 3/52* (2013.01); *B64C 3/10* (2013.01); *B64C 3/32* (2013.01); *B64C 15/02* (2013.01); *B64D 27/24* (2013.01); *B64C 2009/005* (2013.01)

(58) Field of Classification Search
None
See application file for complete search history.

(56) References Cited

U.S. PATENT DOCUMENTS

| | | | | |
|---|---|---|---|---|
| 9,227,721 | B1* | 1/2016 | Nguyen | B64C 9/14 |
| 2002/0005454 | A1* | 1/2002 | MacCready | B64C 1/26 |
| | | | | 244/5 |
| 2004/0118969 | A1* | 6/2004 | MacCready | B64C 1/26 |
| | | | | 244/5 |
| 2009/0261205 | A1* | 10/2009 | Pitt | B64C 3/52 |
| | | | | 244/203 |
| 2014/0084115 | A1* | 3/2014 | Sanchez | B64C 9/00 |
| | | | | 244/76 R |
| 2015/0144742 | A1* | 5/2015 | Moxon | B64D 27/12 |
| | | | | 244/215 |

* cited by examiner

*Primary Examiner* — Nicholas Kiswanto
*Assistant Examiner* — Tamara Weber
(74) *Attorney, Agent, or Firm* — Christopher J. Menke; Robert M. Padilla; Mark P. Dvorscak

(57) ABSTRACT

An aircraft has wings configured to twist during flight. Inboard and outboard propulsion devices, such as turbofans or other propulsors, are connected to each wing, and are spaced along the wing span. A flight controller independently controls thrust of the inboard and outboard propulsion devices to significantly change flight dynamics, including changing thrust of outboard propulsion devices to twist the wing, and to differentially apply thrust on each wing to change yaw and other aspects of the aircraft during various stages of a flight mission. One or more generators can be positioned upon the wing to provide power for propulsion devices on the same wing, and on an opposite wing.

20 Claims, 32 Drawing Sheets

FIG. 18 Continuity Equation – Conservation of Mass

Low voltage battery to AC motor
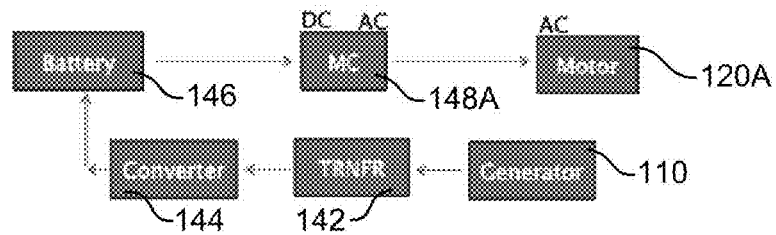
FIG. 22
FIG. 23
High voltage battery to AC motor
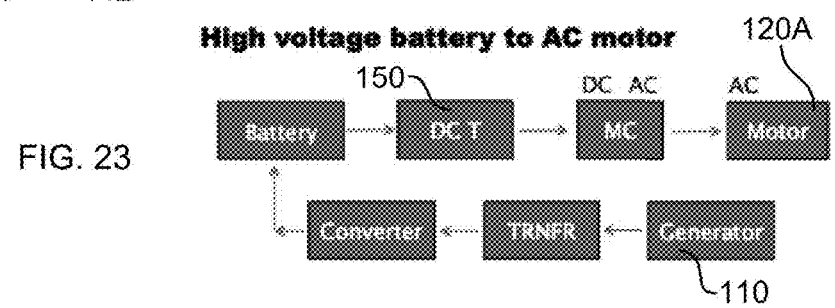
FIG. 24
Low voltage battery to DC motor
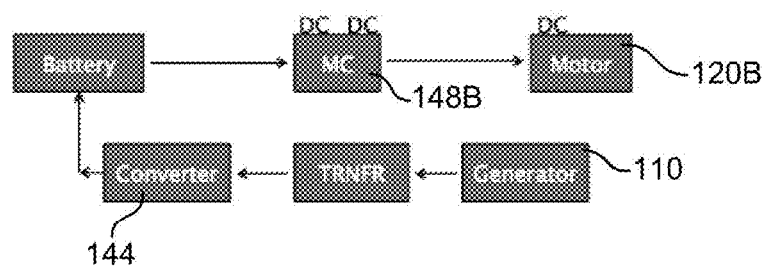
FIG. 25
High voltage battery to DC motor
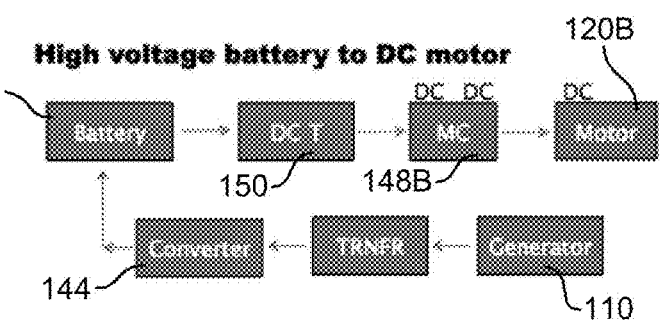
FIG. 26
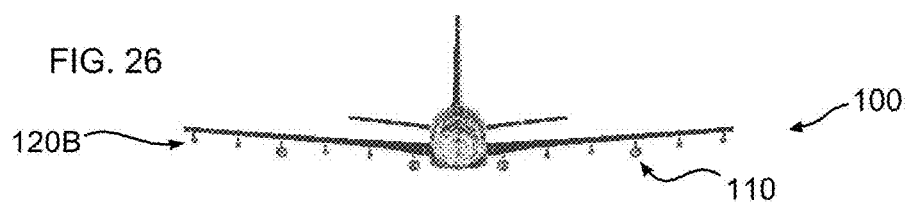

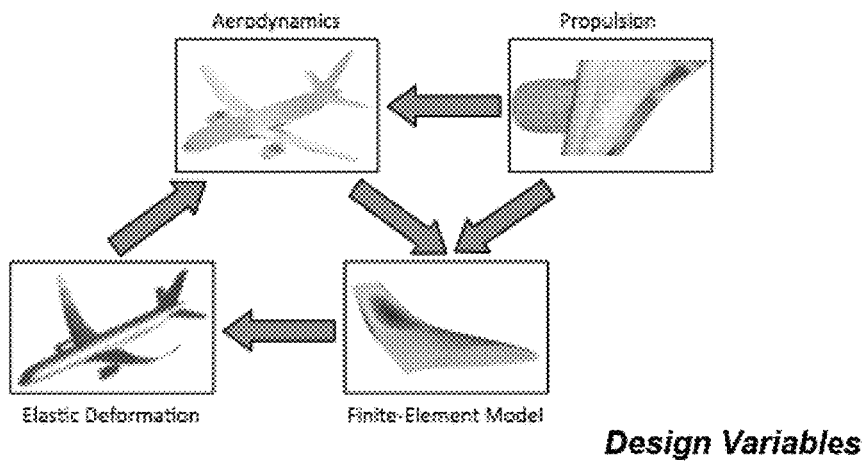
FIG. 36
Design Variables
FIG. 37
Wing: $X_w = \{a_1, a_2, a_3, b_1, b_2, b_3\}$
Propulsion: $Y_p = \{d_1, T_1, u_1, d_2, T_2, u_2, \ldots, d_m, T_m, u_m\}$
Trajectory: $Z_t = \{h_1, v_1, h_2, v_2, h_3, v_3, \ldots, h_n, v_n\}$
FIG. 38
$$f_z^e = \delta(x - x_e)\left[(T\sin\Lambda + m_e g\Gamma')W_x + T\cos\Lambda(\Theta + \gamma) + T\sin\Lambda\Gamma - m_e g\right]$$
FIG. 39
$$\alpha_c = \alpha - \gamma - \Theta\cos\Lambda - W_x\sin\Lambda + \sum_{i=1}^{N}\frac{\partial\alpha}{\partial T_i}T_i$$
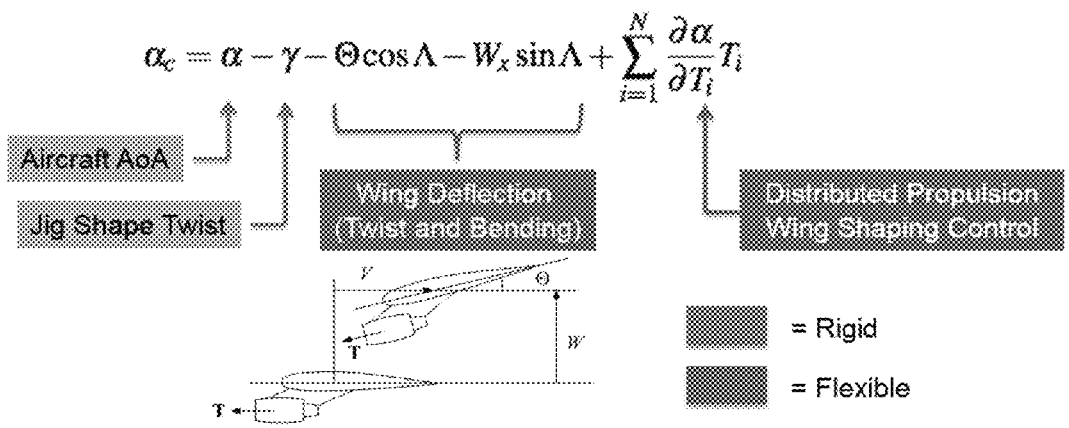

$$\Theta(x) = \Psi(x) K_\theta^{-1} \left( F_{\theta_0} + F_{\theta_\alpha}\alpha + \sum_{i=1}^{N} F_{\theta_{T_i}} T_i \right)$$
FIG. 40
FIG. 41 $\quad W(x) = \Phi(x) K_w^{-1} \left( F_{w_0} + F_{w_\alpha}\alpha + \sum_{i=1}^{N} F_{w_{T_i}} T_i \right)$
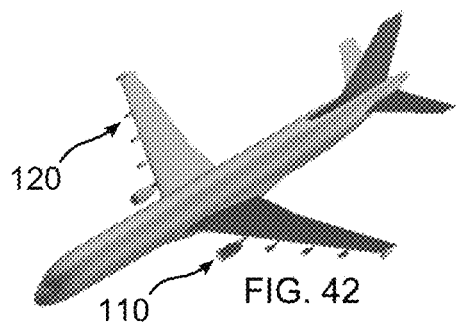
FIG. 42
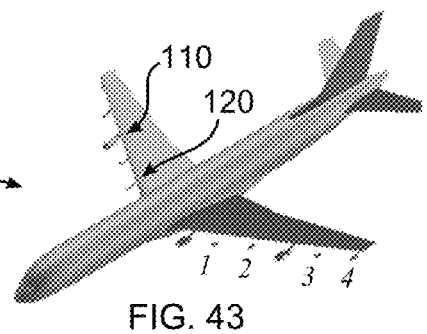
FIG. 43
$$C_L = C_{L_0} + C_{L_\alpha}\alpha + \sum_{i}^{N} C_{L_{T_i}} T_i \quad \text{FIG. 44}$$
FIG. 45
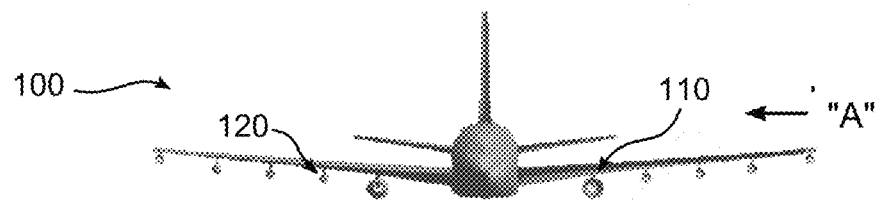

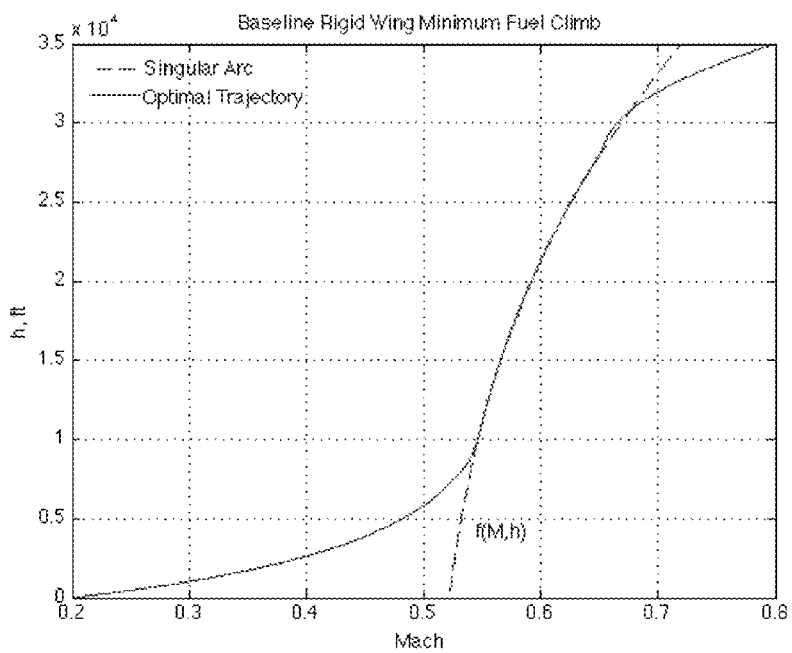
FIG. 56
$$f(V,h) = F + V\frac{\partial F}{\partial V} - \frac{V^2}{g}\frac{\partial F}{\partial h} - \frac{FV}{cT}\left[\frac{\partial (cT)}{\partial V} - \frac{V}{g}\frac{\partial (cT)}{\partial h}\right] = 0 \qquad F = \frac{T-D}{W}$$
FIG. 57
FIG. 58
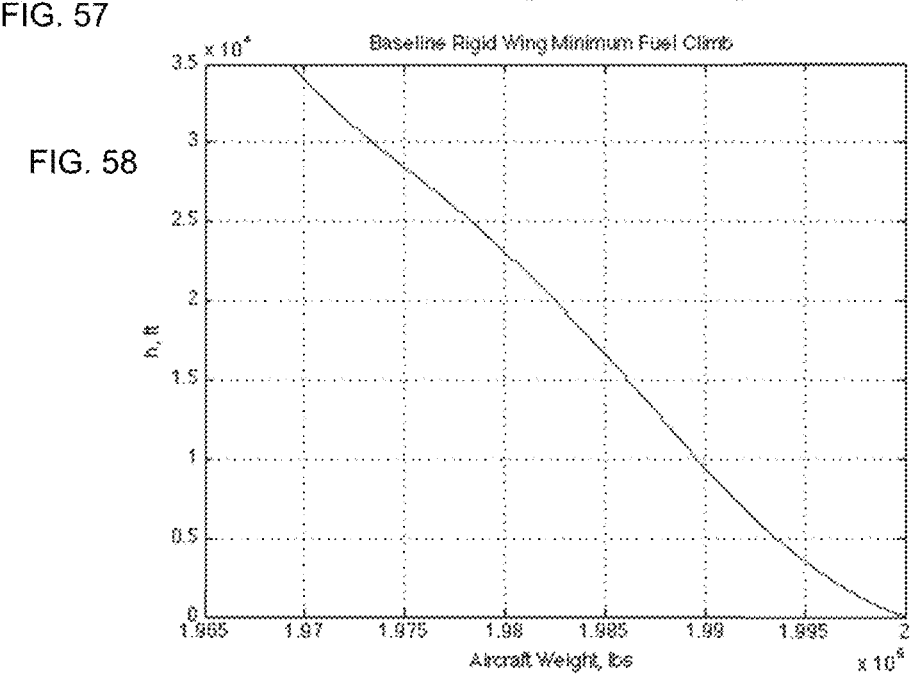

$$r = -\int_{W_i}^{W_f} \frac{V}{c}\left(\frac{L}{D}\right)\frac{dW}{W}$$

FIG. 61

FIG. 62   $c = (0.2921M + 0.2092)\sqrt{\theta(h)\left(1+\frac{\gamma-1}{2}M^2\right)}$

FIG. 63

Cruise Range for 50,000 lbs Fuel Burn

| Wing | Generator | Thrust | Range, mi | % L/D Increase |
|---|---|---|---|---|
| Stiff | Single | Baseline | 3980 | 0.00 |
| Stiff | Single | Uniform | 4084 | 2.61 |
| Stiff | Single | +50%/+50%/-50%/-50% | 4082 | 2.57 |
| Stiff | Single | -50%/-50%/+50%/+50% | 4070 | 2.26 |
| Stiff | Single | +75%/+75%/-75%/-75% | 4083 | 2.59 |
| Stiff | Single | -75%/-75%/+75%/+75% | 4065 | 2.15 |
| Flexible | Single | Baseline | 3891 | 0.00 |
| Flexible | Single | Uniform | 4007 | 2.99 |
| Flexible | Single | +50%/+50%/-50%/-50% | 4048 | 4.04 |
| Flexible | Single | -50%/-50%/+50%/+50% | 3850 | -1.05 |
| Flexible | Single | +75%/+75%/-75%/-75% | 4041 | 3.87 |
| Flexible | Single | -75%/-75%/+75%/+75% | 3763 | -3.29 |
| Stiff | Dual | Baseline | 3980 | 0.00 |
| Stiff | Dual | Uniform | 4002 | 0.55 |
| Stiff | Dual | +50%/+50%/-50%/-50% | 4044 | 1.62 |
| Stiff | Dual | -50%/-50%/+50%/+50% | 3818 | -4.07 |
| Stiff | Dual | +75%/+75%/-75%/-75% | 4032 | 1.32 |
| Stiff | Dual | -75%/-75%/+75%/+75% | 4058 | 1.97 |
| Flexible | Dual | Baseline | 3891 | 0.00 |
| Flexible | Dual | Uniform | 4002 | 2.85 |
| Flexible | Dual | +50%/+50%/-50%/-50% | 4044 | 3.95 |
| Flexible | Dual | -50%/-50%/+50%/+50% | 3818 | -1.88 |
| Flexible | Dual | +75%/+75%/-75%/-75% | 4032 | 3.63 |
| Flexible | Dual | -75%/-75%/+75%/+75% | 3711 | -4.62 |

AEROELASTIC WING SHAPING USING DISTRIBUTED PROPULSION

CROSS-REFERENCE TO RELATED APPLICATIONS

This application claims the benefit of U.S. Provisional Application No. 62/119,013, filed Feb. 20, 2015, the contents of which are incorporated herein in their entirety.

ORIGIN OF INVENTION

The invention described herein was made in the performance of work under a NASA contract and by (an) employee(s) of the United States Government and is subject to the provisions of §20135(b) of the National Aeronautics and Space Act, Public Law 111-314, §3 (124 Stat. 3330, 51 U.S.C. Chapter 201), and may be manufactured and used by or for the Government for governmental purposes without the payment of any royalties thereon or therefore.

BACKGROUND OF THE DISCLOSURE

Technical Field of the Disclosure

The present invention relates to flexible wing shaping, and more particularly to using propulsion distributed along the wing to propel the vehicle and change wing shape.

Description of the Prior Art

The Wright brothers who invented the first aircraft realized the advantages of shape changing bird wings in flight control. They designed a wing warping flight control system to warp a wing by cables to change aircraft directions.

In modern time, NASA had developed a shape changing wing technology in the 1980's under the Mission Adaptive Wing program, which demonstrated a variable camber technology on the F-111 aircraft. The variable camber design allows the wing shape to change in order to adapt to different missions.

A NASA program in the early 2000's called Active Aeroelastic Wing developed a method for elastically shape a flexible wing to perform roll control. The concept is based on using leading edge slats and ailerons to twist highly modified flexible wings of an F-18 aircraft to generate differential lift for roll control.

In recent years, the Boeing 787 aircraft employs a lightweight, flexible wings that can flex substantially during flight. During certification testing, the wings flexed 25 ft upward under a proof load of 150% of the design load.

The NASA Helios prototype is an ultra-lightweight flying wing aircraft with a wingspan of 247 ft. A slight upward twist at the tips of the trailing edge helps prevent wing tip stalls during slow landings and turns. The flying wing aircraft is assembled in six sections, each about 41 ft long. A series of propellers are mounted at the joints of the wing panels. An underwing pod is attached at each panel joint to carry the landing gear, the battery power system, flight control computers, and data instrumentation.

To turn the Helios aircraft in flight, yaw control is applied by applying differential power on the motors—speeding up the motors on one outer wing panel while slowing down motors on the other outer panel. A major test during the initial flight series was the evaluation of locally varying motor power as a means of pitch control. During normal cruise the outer wing panels of Helios are arched upward and give the aircraft the shape of a shallow crescent when viewed from the front or rear. This configuration places the motors on the outer wing panels higher than the motors on the center panels. Speeding up the outer-panel motors caused the aircraft to pitch down and begin a descent. Conversely, applying additional power to the motors in the center panels caused Helios to pitch up and begin climbing.

SUMMARY OF THE INVENTION

In an embodiment of the disclosure, an aircraft comprises at least two wings, each wing configured to twist during flight along a portion of the length of the wing; at least one inboard propulsion device connected to each wing, located at some distance along the wing span; at least one outboard propulsion device connected to each wing, located at some distance along the wing span, the at least one outboard propulsion device positioned closer to a wing tip of the wing to which it is connected than the at least one inboard propulsion device; and a controller configured to independently control thrust of the at least one outboard propulsion device and the at least one inboard propulsion device, including controlling thrust of the at least one outboard propulsion device to produce the twist to thereby significantly change flight dynamics of the aircraft while maintaining aeroelastic stability.

In variations thereof, the propulsion devices are positioned in the chordwise direction relative to the wing airfoil; the inboard and the outboard propulsion devices are positioned on at least one of the upper, lower, or both surfaces of the wing; the controller is configured to independently control thrust of the at least one inboard propulsion device and the at least one outboard propulsion device, to change a yaw angle of the aircraft while maintaining lift of the aircraft; the controller is configured to independently control thrust of each of the at least one inboard propulsion device and each of the at least one outboard propulsion device for each wing, to thereby control flight dynamics of the aircraft in the event of failure of at least one inboard or outboard propulsion device; and/or the controller is configured to independently control thrust of the at least one outboard propulsion device and the at least one inboard propulsion device to thereby twist and change the shape of the wings to improve L/D during at least one of takeoff, cruise, and landing of the aircraft while maintaining aeroelastic stability.

In other variations thereof, the at least one inboard propulsion device and the at least one outboard propulsion device include at least four propulsion devices; the at least one inboard propulsion device and the at least one outboard propulsion device are electric fan engines; the aircraft further includes at least one electricity generator configured to generate electricity to operate the electric fan engines; there are at least one generator connected to each wing; the generator is configured to produce maximum electricity and minimum thrust; the generator is connected to a transformer, and the transformer is connected to a battery, and the electric fan engines are connected to the battery; the transformer is a step-down transformer; electricity generated by the generator is passed to the controller; at least one of the at least one outboard propulsion device is located proximate the wing tip; and/or at least one of the at least one inboard propulsion device or the at least one outboard propulsion device is an electric fan engine.

In a yet further embodiment thereof, the electrical system of the aircraft includes a battery configured to provide electricity to an electric fan engine; the aircraft further includes at least one propulsion device proximate a tip of the wing forming a winglet operative to reduce wing tip vortices for drag reduction; and/or the aircraft further includes at one propulsion device and a thrust vector flap positioned directly behind the propulsion device to generate the vertical lift component to change the wing bending shape.

In another embodiment thereof, the aircraft further includes at least one propulsion device configured to impart a lateral thrust force to create bending moment to change the shape of the wings to improve L/D during at least one of takeoff, cruise, and landing of the aircraft while maintaining aeroelastic stability. In variations thereof, the lateral thrust component is created by at least one propulsion device that can be articulated so that the thrust vector is at an angle relative to the aircraft axis; the lateral thrust component is created by at least one propulsion device equipped with a thrust vectoring nozzle; and/or the lateral thrust component is created by at least one propulsion device equipped with a thrust vectoring plate positioned directly behind the propulsion device and made pivotable in an axis perpendicular to the wing planform.

In another embodiment of the disclosure, a method of changing flight dynamics during flight of an aircraft, comprises providing an aircraft having: at least one inboard propulsion device connected to each wing; at least one outboard propulsion device connected to each wing, the at least one outboard propulsion device positioned closer to a wing tip of the wing to which it is connected than the at least one inboard propulsion device; two wings each configured to twist during flight along a portion of a length of the wing using the at least one outboard propulsion device; and a controller configured to independently control thrust of the at least one outboard propulsion device and the at least one inboard propulsion device, including controlling thrust of at least the at least one outboard propulsion device to cause the twist during flight.

In variations thereof, twisting is carried out by the controller by applying at least 50% more thrust to the at least one outboard propulsion device and at least 50% less thrust to the at least one inboard propulsion device; the controller is configured for distributing power to reduce or eliminate asymmetric thrust due to power loss; the controller is configured for carrying out a coordinated turn control using asymmetric thrust only; the controller is configured for yaw control using asymmetric thrust in coordination with controlling aileron positioning; the controller is configured for yaw control using asymmetric thrust in coordination with controlling rudder positioning; and/or the controller is configured for changing propulsion distribution and thrust-induced lift, and aileron and rudder positioning, to achieve overall flight control in the lateral-directional motion.

BRIEF DESCRIPTION OF THE DRAWINGS

The accompanying figures, where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIGS. 16A-16D depict propulsion interaction with wing aerodynamics, in which FIG. 16A illustrates the interaction for a wing without propulsors or generators, FIG. 16B illustrates the GTM, FIG. 16C illustrates the embodiment of FIG. 13, and FIG. 16D illustrates the embodiment of FIG. 14;

FIG. 17-18 shows equations used by modeling of the disclosure to determine a required fan configuration of suitable thrust for the embodiment being modeled;

FIGS. 22-25 depict various configurations for an electrically propelled aircraft of the disclosure;

FIG. 26 depicts an embodiment of an aircraft configuration of the disclosure;

FIG. 36 illustrates a multidisciplinary design analysis and optimization matrix;

FIG. 37 illustrates design variables for wings, propulsion, and trajectory used in modeling of the disclosure;

FIG. 38 is an equation used in modeling in accordance with the disclosure, incorporating aero-propulsive-elastic interactions for thrust-induced lift force, thrust-induced elastic deformation, and thrust-induced angle of attack;

FIG. 39 is an equation used in modeling in accordance with the disclosure, for determining a local aeroelastic angle of attack;

FIG. 40 is an equation used in modeling twisting moments, in accordance with the disclosure;

FIG. 41 is an equation used in modeling bending moments, in accordance with the disclosure;

FIG. 42 depicts an aircraft embodiment of the disclosure having one generator per wing, and four spaced propulsors;

FIG. 43 depicts an aircraft embodiment of the disclosure having two generators per wing, each generator flanked by two propulsors;

FIG. 44 is an equation of the disclosure for modeling sensitivity of thrust-induced lift with propulsor spacing;

FIG. 45 depicts an alternative view of the aircraft of FIG. 42;

FIGS. 48-51 are plots depicting the effect of wing stiffness on lift-to-drag ratio, where various levels of thrust are applied by propulsors distributed along the wing, and in which FIG. 48 shows lift distribution along a stiff wing;

FIG. 49 shows aerodynamic efficiency at various angles of attack, for a stiff wing;

FIG. 50 shows lift distribution along a flexible wing; and

FIG. 51 shows aerodynamic efficiency at various angles of attack, for a flexible wing;

FIGS. 52-55 are plots depicting relative improvement of L/D for embodiments of the disclosure over a baseline aircraft configuration, where various levels of thrust are applied by propulsors distributed along the wing, and in which FIG. 52 depicts a stiff wing having 1 generator and 4 fans per wing;

FIG. 53 depicts a stiff wing having 2 generators and 4 fans per wing;

FIG. 54 depicts a flexible wing having 1 generator and 4 fans per wing; and

FIG. 55 depicts a flexible wing having 2 generators and 4 fans per wing;

FIGS. 56-58 relate to trajectory optimization, in which

FIG. 56 is a plot of an optimized climb out;

FIG. 57 depicts a formula for calculating the climb out of FIG. 56, and particularly a maximum thrust climb along an optimal singular arc; and FIG. 58 is a plot of an optimized descent;

FIGS. 59-62 pertain to analyzing cruise range for various levels of thrust applied by propulsors distributed along a wing with a single generator, and in which FIG. 59 is a plot of range and cruise altitude for an aircraft embodiment having a stiff wing;

FIG. 60 is a plot of range and cruise altitude for an aircraft embodiment having a flexible wing;

FIG. 61 is Breguet's range equation; and

FIG. 62 is a formula for specific thrust fuel consumption for turbofan engines;

FIG. 63 is a table of an analysis of L/D for stiff and flexible winged embodiments, for single and dual generators, and for various alternatives of thrust distributions;

DETAILED DESCRIPTION OF THE INVENTION

Figure 1:
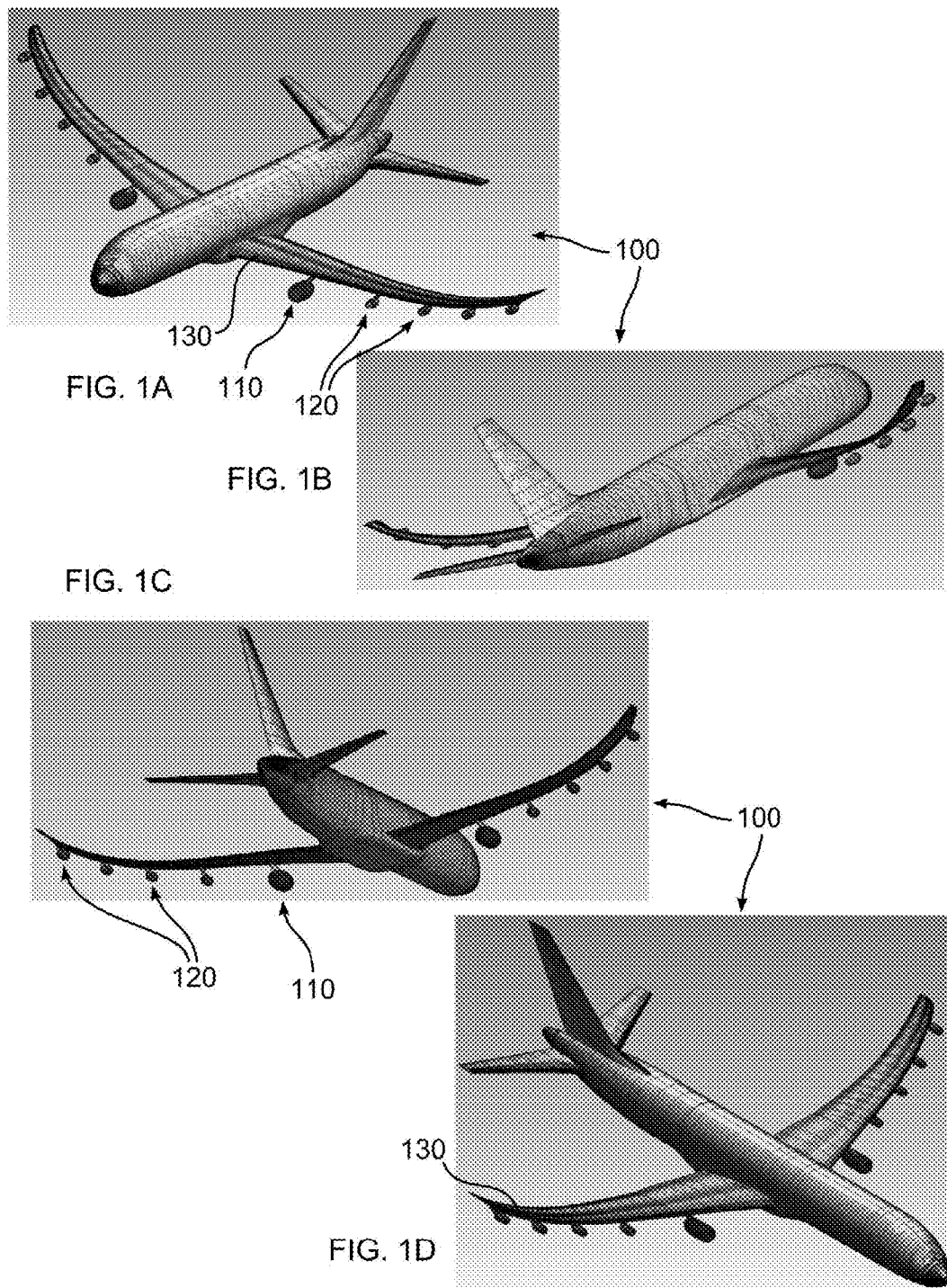
FIG. 1A to 1D depict perspective views of a model of an embodiment of an aircraft having distributed thrust and flexible wings of the disclosure, the aircraft in flight.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The figures herein are drawn for ease of understanding, and are not drawn to scale or proportion.

In accordance with the disclosure, distributed propulsion and lightweight structures on air-breathing air vehicles pose a significant opportunity to improve mission performance while meeting next generation requirements including reduced fuel burn, lower emissions and enhanced takeoff and landing performance. Flexible wing-shaping aircraft using distributed propulsion enable the ability to achieve improved aerodynamic efficiency while maintaining aeroelastic stability. Wing shaping concepts using distributed propulsion leverage the ability to introduce forces/moments into the wing structure to affect the wing aerodynamics.

Further in accordance with the disclosure, wing shaping can be performed throughout the flight envelope to affect local angle of attack as the wing loading changes with air vehicle weight during cruise. By softening the structural stiffness of an unoptimized wing geometry, the inventors have demonstrated using trajectory optimization that this concept could achieve about a 4% improvement in lift-to-drag ratio, or L/D, compared with a stiff wing design across a mission profile consisting of a minimum fuel climb, cruise, and continuous descent. The reduction in fuel burn can be attributed to a reduction in lift-dependent drag throughout the flight envelope by actively tailoring the spanwise lift distribution using distributed propulsion. The disclosure enables synergistic interactions between lightweight materials, electric propulsion, and active aeroelastic tailoring for reducing the environmental impact of future air vehicles.

In accordance with the disclosure, flexible wing shaping is achieved using propulsion distributed along the wing to propel the vehicle and change the wing shape. This achieves improved aerodynamic efficiency and increased lift. Moreover, a method for combined roll-yaw control of an aircraft using distributed propulsion by taking advantage of wing flexibility is disclosed.

Birds in nature have wings, which flex during flight. Birds perform their flight maneuvers by changing their wing shapes continuously based on their needs. Shape changing bird wings have inspired many aircraft designers since the early days of manned flight. In accordance with the disclosure, highly elastic flexible bird wings suggest, in part, advantages that have not been emulated in past and current aircraft design, including advantages of flexible wing shaping control, and which are disclosed herein.

It has further been determined, in accordance with the disclosure, that the prior art did not suggest, for example, at least elastically shaping flexible wings for mission performance, or aerodynamic performance for twisting ailerons, as these can generate increased drag.

In an embodiment of the disclosure, distributed electric propulsion for transport aircraft poses a significant opportunity to meet next generation requirements including reduced fuel emissions and enhanced takeoff and landing performance. Since current electric motors produce only a fraction of the power output of combustion engines of similar size, future hybrid electric propulsion engines are expected to be smaller in size and distributed along the wingspan.

The concept of "generalized force" is associated with the effective force acting on a flexible structure. By definition, the generalized force is an integral product of all forces acting on a structure and a corresponding mode shape. The static mode shape of a wing structure is a monotonically increasing function from zero at the wing root to a maximum value at the wing tip. Thus, as thrust is applied further away from the wing root, the generalized thrust force also increases. If not carefully considered, increasing the generalized thrust force can cause undesired wing twist, leading to sub-optimal lift distributions and/or inadvertent stall. An important example is the Helios aircraft that crashed due to aeroelastic effects unaccounted for in the control laws. The disclosure provides an effective design and methods for addressing these challenges.

The concept of "generalized mass" is associated with the effective mass of a flexible structure. By definition, the generalized mass is an integral product of all masses that comprise a structure and a corresponding mode shape. Distributed propulsion results in the placement of a plurality of propulsion devices along a wing span. Thus, the generalized mass associated with distributed propulsion depends on the placement of the propulsion devices as well as a given dynamic mode shape.

The concept of "generalized stiffness" is associated with the effective stiffness of a flexible structure. By definition, the generalized stiffness for bending is an integral product of all stiffness contributions and the second derivative of a corresponding bending mode shape, and the generalized stiffness for torsion is an integral product of all stiffness contributions and the first derivative of a corresponding torsion mode shape. As the pitching moment created by a thrust force causes a wing section to twist, the orientation of the thrust vector also changes. This results in a force-follower effect that creates a thrust-induced stiffness. Thus, the thrust-induced generalized stiffness associated with distributed propulsion depends on the placement of the propulsion devices as well as a given dynamic mode shape.

If not carefully considered, changes in the generalized mass and stiffness can result in adverse aeroelastic stability interactions known as flutter which is a dynamic aeroelastic instability associated with unstable vibration and divergence which is a static aeroelastic instability associated with unstable static deflection of a flexible structure. Aircraft are designed to meet flutter certification requirements to ensure flutter free operation inside a flight envelope. The disclosure provides an integrated design and methods for addressing these challenges.

The disclosure additionally provides for creating fuel optimal trajectories that take into account the potential adverse interaction between distributed propulsion and wing flexibility. By explicitly including this interaction in mission design, it is possible to avoid a resulting increase in energy consumption which otherwise could diminish the benefits of distributed propulsion.

The disclosure enables, for example, development of a flexible wing generic transport aircraft model with distributed electric propulsion operating at cruising speed of Mach 0.8, and with a cruise ceiling of 35,000 ft. Additionally, the disclosure enables the design of a fuel-optimal mission profile comprised of climb, cruise, and continuous descent by performing trajectory optimization that accounts for wing aeroelasticity and performance parameters, to obtain an optimal thrust distribution along the wingspan.

The disclosure can be used to create, for example, a distributed propulsion model with dynamic aeroelasticity for flutter analysis in Matlab, and a trajectory generation algorithm incorporating fuel optimal cost function. Fuel savings can additionally be calculated.

The disclosure provides a flexible wing-shaping aircraft able to achieve improved aerodynamic efficiency while maintaining aeroelastic stability using distributed propulsion. The propulsive moments produced from a set of distributed propulsion devices mounted along the wing can be used to optimize L/D by modifying wing twist and bending.

With reference to FIGS. 1A-1D, an embodiment of the disclosure includes an air breathing aircraft 100 having a plurality of inboard turbofan engine cores (shown one per wing only for illustration) which serve as generators 110 for powering propulsion devices 120 which could be electric fans distributed along the outboard section of each wing 130.

The disclosure provides examples using a baseline aircraft having characteristics of a Boeing 757; however, it should be understood that the disclosure can be carried out with a wide variety of aircraft. A variety of configurations of differing numbers and locations of turbofans and propulsion devices, extent of thrust, and nacelle sizes, and placement along the wing span either above or below wing and either forward or aft of the wing leading edge or trailing edge can be provided along the wing, to meet applicable requirements for takeoff, climb, and cruise performance. Thus, the illustrated placement below the wings illustrates just one possible placement embodiment. In accordance with the disclosure, as wing flexibility increases, thrust distribution can be made to change the wing local angle of attack significantly, so as to affect aircraft performance in a beneficial way.

In accordance with the disclosure, engine placement near the wing tip will typically produce larger generalized forces for wing shaping, while engine placement closer to the wing root, where the generalized mass and is low, is more favorable for aeroelastic stability from flutter consideration. Optimization of desired characteristics includes selecting a placement location along the wing for each propulsion device and generator to balance these attributes and achieve wing shaping control effectiveness while maintaining sufficient aeroelastic stability.

For a distributed propulsion layout and wing planform, wing torsion and bending stiffness properties are optimized for both weight reduction and lift distribution for a cruise configuration to take advantage of distributed propulsion wing shaping. This is in contrast to the ordinary skill of the art which does not take advantage distributed propulsion wing shaping. For example, a conventional stiff wing cannot be easily exploited by distributed propulsion wing shaping than a wing structure that is specifically tailored aeroelastically to exploit the aeroelastic-propulsive interactions for beneficial purposes. An aeroelastic-propulsive model can be developed in accordance with the disclosure to capture the aeroelastic-propulsive interactions on the wing. For optimization studies, this model can be coupled with an aircraft aerodynamic model to assess aircraft performance in terms of the quantity L/D.

The wing stiffness, jig-shape twist distribution, and thrust distribution are tailored in a synergistically way to get an optimal lift distribution in the presence of distributed propulsion. For under-wing mounted propulsion, a positive nose-up twist is generated. On the hand, the aeroelastic wash-out twist due to bending and torsion is normally negative nose-down. Thus, the jig-shape twist, that is the geometric twist of a wing in manufacture, must be designed to account for the positive twist due to under-wing mounted distributed propulsion. This would imply a more negative nose-down jig-shape twist. Current transport aircraft typically has a jig-shape twist that varies from about 2 to 3 degrees at the wing root to about −3 to −5 degrees at the wing tip. With under-wing mounted distributed propulsion, depending on the wing stiffness and thrust distribution, a typical jig-shape twist could be tailored to have more negative twist at the wing tip.

The converse is true for over-wing mounted distributed propulsion which creates a negative nose-down twist. In this case, the jig-shape twist could be tailored to have less negative nose-down twist.

In accordance with the disclosure, the wing stiffness, jig-shape twist distribution, thrust distribution, and placement of the distributed propulsion devices are to be designed in an integrated and synergistic manner by employing an aeroelastic-propulsive model coupled with an aerodynamic model. Any of these design parameters can be exploited in the design to attain maximum aerodynamic benefits by taking advantage of distributed propulsion wing shaping.

It should be understood that the thrust distribution can be tailored in any advantageous orientation relative to the aircraft fuselage centerline. While one preferred embodiment discloses a method of applying distributed propulsion with the thrust vector orientation that lies on the symmetric plane of the aircraft, it is also possible that alternate embodiments teach a method of applying distributed propulsion in different orientations. For example, one embodiment discloses a concept utilizing one or more propulsion devices generating thrusts with a lateral component normal to the symmetric plane of the aircraft. This lateral thrust component can be exploited in a number of advantageous ways to improve aerodynamic efficiency L/D and aircraft flight control. One such method is to take the advantage of lateral thrust component to create a bending moment that acts to increase or decrease bending of a wing actively to shape the wing wash-out twist distribution for optimal aerodynamic performance. For example, an outward lateral thrust component of an under-wing mounted propulsion device will create a positive bending moment to increase bending. Another method is to accomplish a yaw control by differentially applying the lateral thrust component to create a yawing moment and a side force to yaw an aircraft without utilizing a rudder for yaw control.

Figure 2:
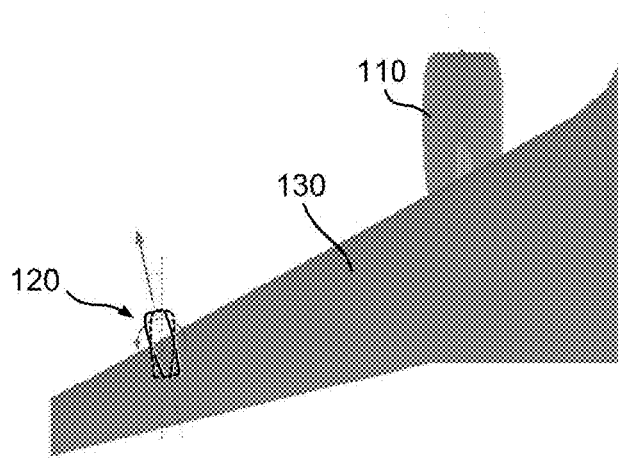
FIG. 2 depicts a propulsion device of the disclosure that can generate lateral thrust.

One embodiment of a propulsion device that can generate a lateral thrust component is as shown in FIG. 2, which illustrates wing 130 with a generator 110 and a plurality of propulsion devices 120 arranged as disclosed elsewhere herein, only one of which is shown in the illustration of FIGS. 2-3, for clarity. In particular, the propulsion device 120 of FIG. 2 has the ability to rotate in a plane parallel to the wing planform about a fixed or non-fixed point. When the propulsion device 120 is rotated away from the thrust centerline, a lateral thrust component is created for the purpose of introducing additional bending moment to change the wing bending shape, or for generating a side force and a yawing moment. The propulsion devices can be individually adjusted in their rotation to create any desired bending moment distribution or side force and yawing moment.

Figure 3A:
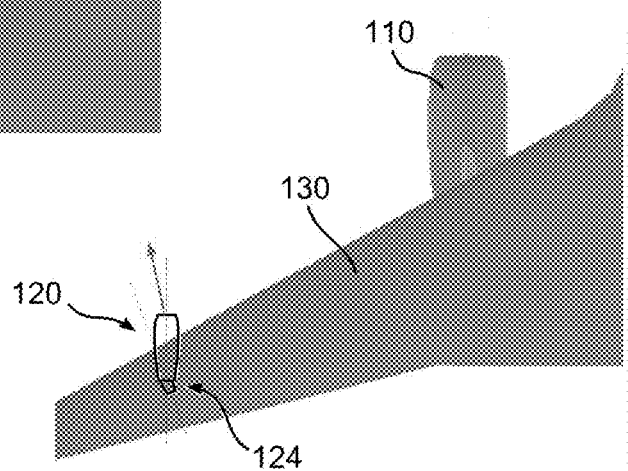
FIG. 3A depicts a thrust vectoring nozzle in accordance with the disclosure.

Another embodiment is illustrated in FIG. 3A which shows a propulsion device 120 equipped with a thrust vectoring nozzle 124 that can be oriented to the left or right in order to generate a lateral thrust component. In particular, thrust vectoring nozzle 124 creates a momentum force in the lateral direction as the fluid leaves the nozzle at an angle relative to the flow direction. In other embodiments, nozzle 124 can additionally or alternatively be moved up and down for wing shaping or to create momentum force in other directions.

Figure 3B:
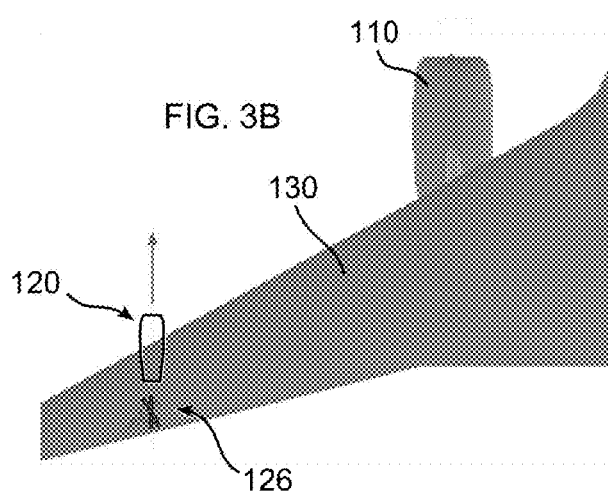
FIG. 3B depicts a thrust vectoring plate of the disclosure.
Figure 4:
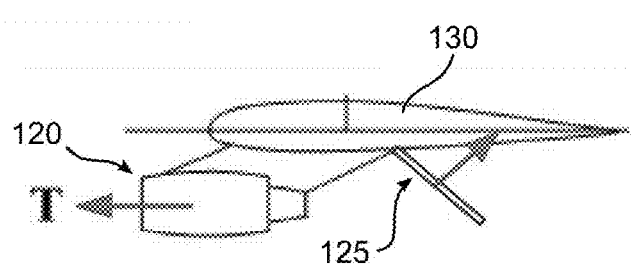
FIG. 4 depicts an alternative thrust vectoring plate of the disclosure.

In yet another embodiment, shown in FIG. 3B, a thrust vectoring plate 126 is used to generate a lateral thrust component by redirecting thrust from propulsion device 120. Thrust vectoring plate 126 has the ability to rotate about a fixed or non-fixed point through an axis perpendicular to the wing planform. As the thrust vectoring plate 126 is rotated away from the thrust centerline, the exhaust flow impinging on the thrust vectoring plate 126 creates a lift force perpendicular to, and a small drag force in the direction of, exhaust flow. This lift force creates a lateral force component that generates either bending moment to change the wing bending shape or side force and yawing moment for yaw control. In FIG. 4, a vectoring plate 125 can be pivoted about one end, or otherwise moved into exhaust flow to redirect exhaust flow downwards to exert a force in an alternative direction. The embodiments of FIGS. 2-4 can be combined with each other, and with other embodiments of the disclosure.

Further in accordance with the disclosure, a mission profile consisting of climb-to-altitude, cruise, and descent can be designed for a typical cruise range. Different cruise modes such as climb cruise and constant airspeed and altitude cruise can be modeled as benefits a particular application. A trajectory optimization can be conducted to determine the optimal mission profile for minimum fuel burn. This optimization can utilize a point-mass aircraft dynamic model formulated in conjunction with a propulsion performance model, wing aeroelastic-propulsive model, and aircraft aerodynamic model of the disclosure. The optimization produces distributed propulsion thrust requirements for wing shaping as functions of airspeed and altitude continuously along the mission profile.

A mission performance analysis of an outboard powered-lift option for inducing wing twist and bending using a thrust-vectoring flap concept can be developed in accordance with the disclosure. For example, under-wing thrust-vectoring flaps can be installed directly in-line with the thrust vectors and in proximity to the distributed propulsion devices, as shown in FIGS. 3B and 4. For example, thrust-vectoring flaps 125, 126 can be deployed to change the thrust vector orientation so as to increase lift or to induce with twist and bending to improve aerodynamic performance. In the case of flaps 125, for example, the change in the thrust vector orientation is due to exhaust flow impinging on the thrust vectoring flaps 125, which generates a force nearly perpendicular to the thrust vectoring flaps 125, thereby creating a vertical lift force component. This concept can serve as a multi-use control device for increasing lift performance while minimizing drag in lieu of conventional flap deployment in high lift configurations.

Use of electric propulsion for at least some of the distributed propulsion devices has the potential to further reduce $CO_2$ and $NO_x$ emitted by traditional gas turbine engines. Noise footprint can potentially be reduced at low altitudes due to distributed propulsion and thrust tailoring. Reduced field length and "clean" wing shaping configurations will provide added benefits. Trajectory optimization could also be performed to determine suitable thrust settings of the distributed propulsion devices to minimize a noise footprint. For example, an embodiment could be a concept employing both under-wing and over-wing mounted propulsion devices. During landing, the over-wing mounted propulsion devices are commanded to generate more thrust while the under-wing mounted propulsion devices are at an idle thrust setting. This configuration could be advantageous in reducing community noise near the airport. Alternatively, during a turn maneuver, certain propulsion devices can be commanded to generate more thrust while the others are at an idle thrust setting to deflect the noise source away from the ground.

While wing shaping can integrate well with current aviation standards, a new generation of aircraft of the disclosure can self-reconfigure and optimize for reduced fuel burn at any position in the available flight envelope.

Potential benefits of appropriate wing shaping of the disclosure include exploiting multidisciplinary interactions while maintaining aeroelastic stability, and include mission adaptive wing shaping; improved off-design performance; potential reduction in system and aircraft weight, and flutter suppression. Wing shaping concepts of the disclosure can exploit trade offs between wing flexibility and span efficiency, including structural weight reduction, and fuel burn reduction of at least 4%, for example. Greater weight reduction and lower fuel burn are possible in other embodiments.

Distributed propulsion of the disclosure can improve propulsive efficiency and eliminate or reduce control surfaces, with the potential benefits of reducing aircraft weight, hence fuel burn. In various embodiments, a synergistic fuel burn benefit obtained from both wing shaping and distributed propulsion can be achieved during more than one phase of a mission profile, for example during all phases of flight.

FIGS. 1-4 illustrate various view of one embodiment of an aircraft 100 of the disclosure, including one inboard generator 110 and four outboard fans 120 on each wing. Note that the outer extent of the wings curve upwardly significantly. Inflected designs, where portions of the wings alternate in upward and downward deflection are also achievable in accordance with the disclosure.

To create an aircraft of the disclosure, it is useful to consider distributed propulsion aircraft design and modeling, wing aeroelastic tailoring for optimal L/D, flutter analysis for determining a flight envelope, and mission performance analysis by trajectory optimization. Additionally, it is useful to consider a weight estimation of distributed propulsion components, differential thrust in place of rudder control, vertical tail sizing for a disabled generator on one wing, and an overall system architecture and desired benefits.

It should be understood that the term 'modeling' as used herein can be considered interchangeably with the term 'design', and is carried out to determine a configuration of an aircraft of the disclosure for carrying out a particular flight mission.

Figure 5:
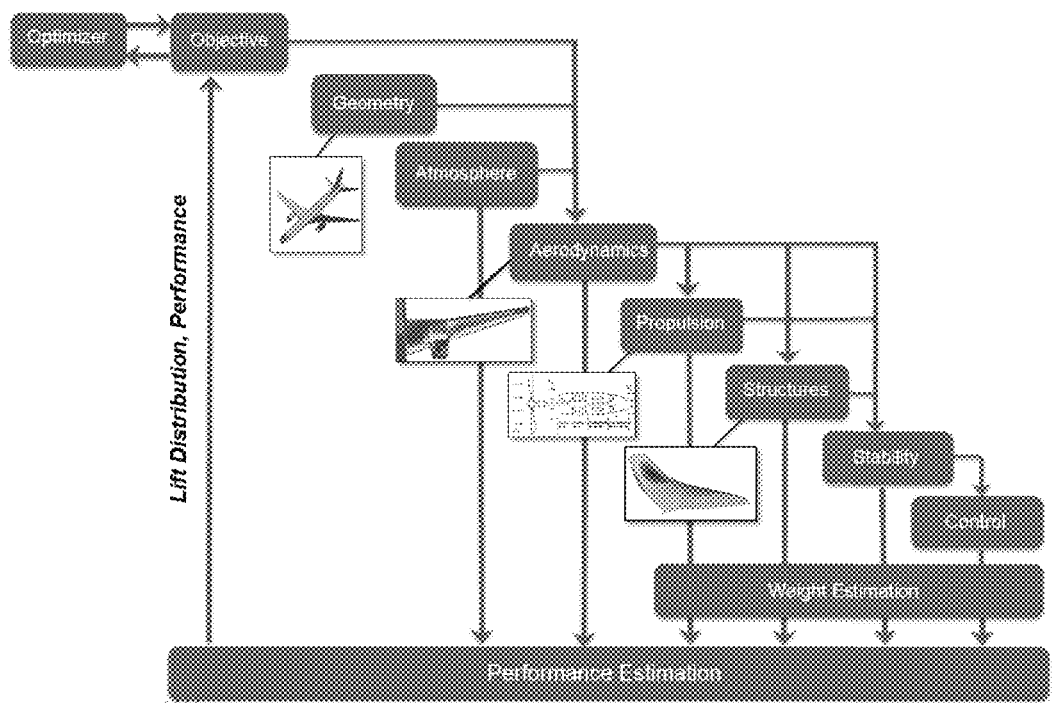
FIG. 5 depicts a multidisciplinary approach to design of an aircraft of the disclosure, illustrating relationships among the various disciplines.

Accordingly, a multidisciplinary design and optimization roadmap can be used, including: geometry, which can be determined in part using, for example, OpenVSP/Matlab; atmospheric factors; aerodynamics, which can be determined in part using, for example, Vorlax/CBAero; propulsion, which can be determined in part using, for example, NPSS/WATE; structural factors, which can be determined in part using, for example, a finite element model; stability factors, and control factors. A relationship of these various factors is illustrated in FIG. 5.

Figure 6:
FIG. 6 depicts an embodiment of an aircraft of the disclosure.
Figure 7:
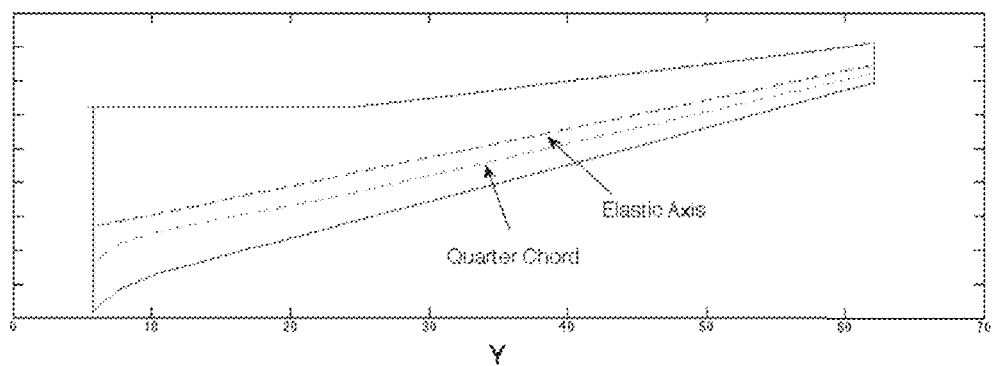
FIG. 7 depicts planform geometry of a wing as used in a modeling tool of the disclosure.
Figure 8:
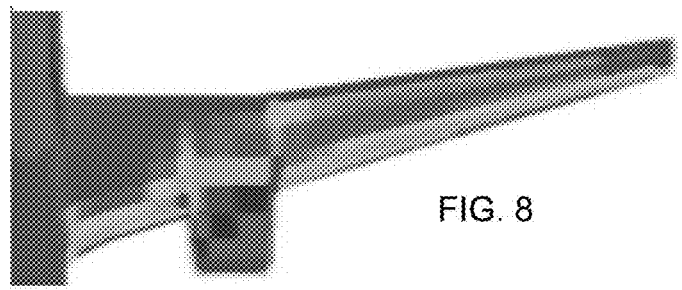
FIG. 8 depicts pressure distribution on a wing using the modeling tool of FIG. 7.
Figure 9:
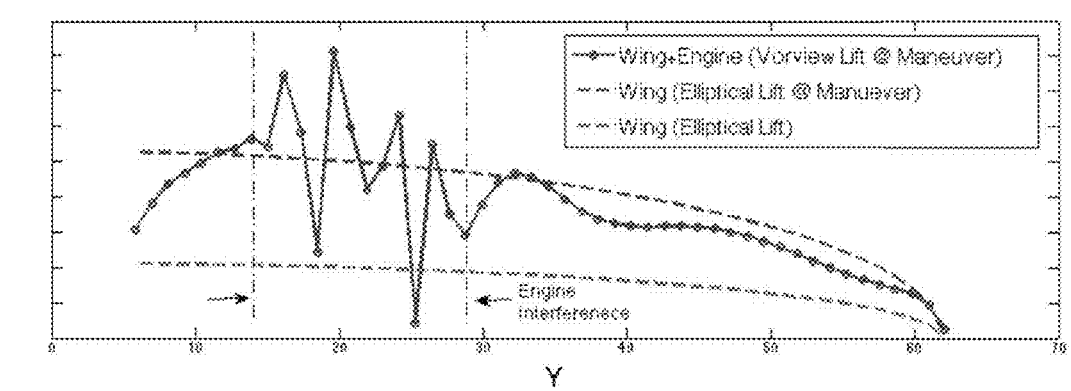
FIG. 9 depicts vertical lift distribution using the modeling tool of FIG. 7.
Figure 10:
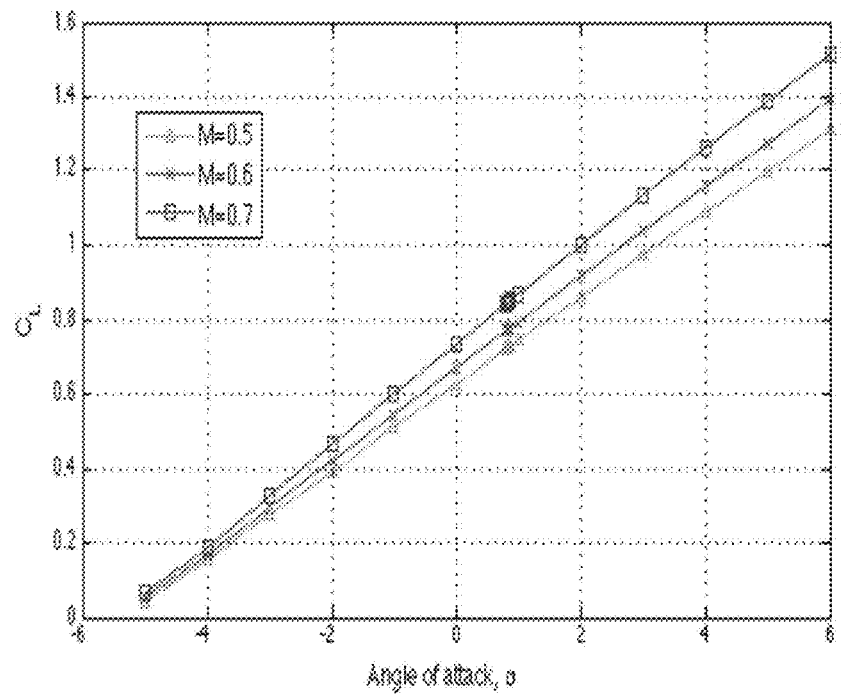
FIG. 10 depicts lift curves using the modeling tool of FIG. 7.
Figure 11:
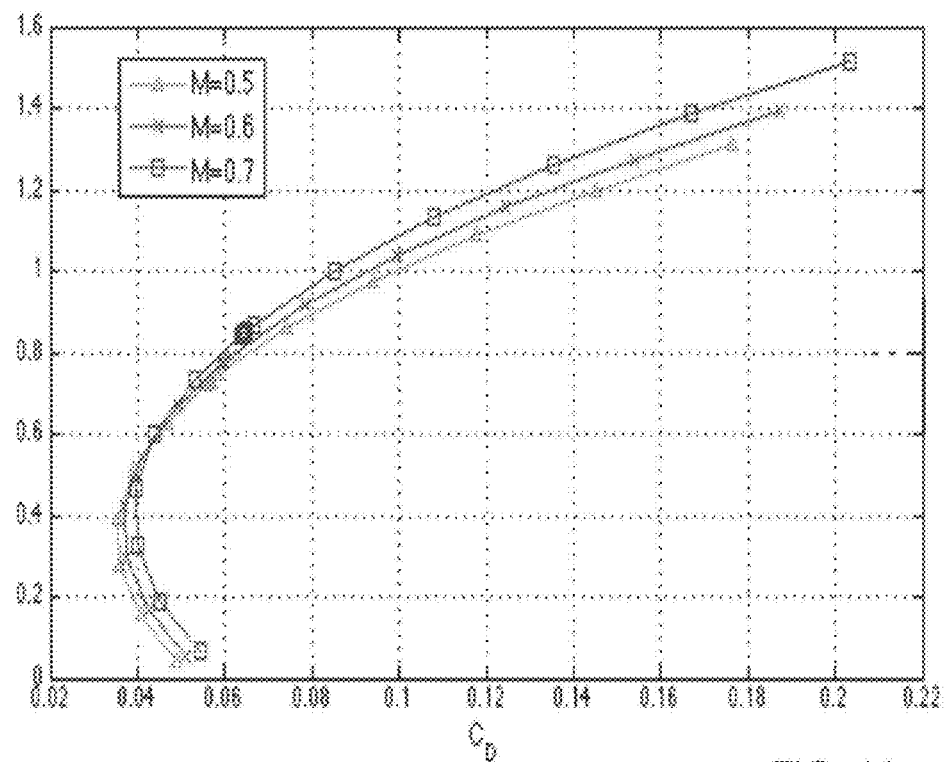
FIG. 11 depicts drag polars using the modeling tool of FIG. 7.

In FIG. 6, a generic transport model has been modified using mathematical modeling to include a distributed propulsion configuration and flexible wings of the disclosure. The modified design is generated by an automated geometry modeling tool for distributed propulsion and flexible wing aircraft of the disclosure. With reference to FIGS. 7-15, a vortex lattice model enables rapid lift curve and drag polar generation across various Mach numbers. As illustrative examples, FIG. 7 illustrates modeling of planform geometry, FIG. 8 illustrates pressure distribution, FIG. 9 illustrates vertical lift distribution, FIG. 10 illustrates lift curves at various speeds, and FIG. 11 illustrates drag polars.

Figure 12:
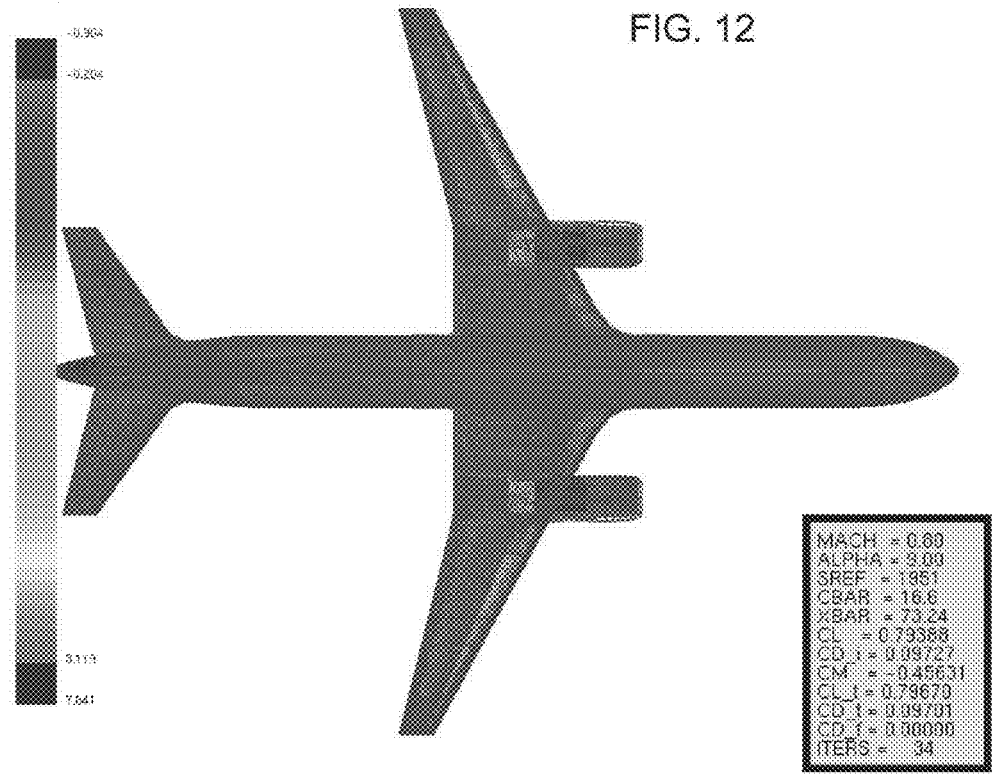
FIG. 12 depicts an aerodynamic analysis of the disclosure of a prior art baseline generic transport model (GTM)
Figures 13, 14:
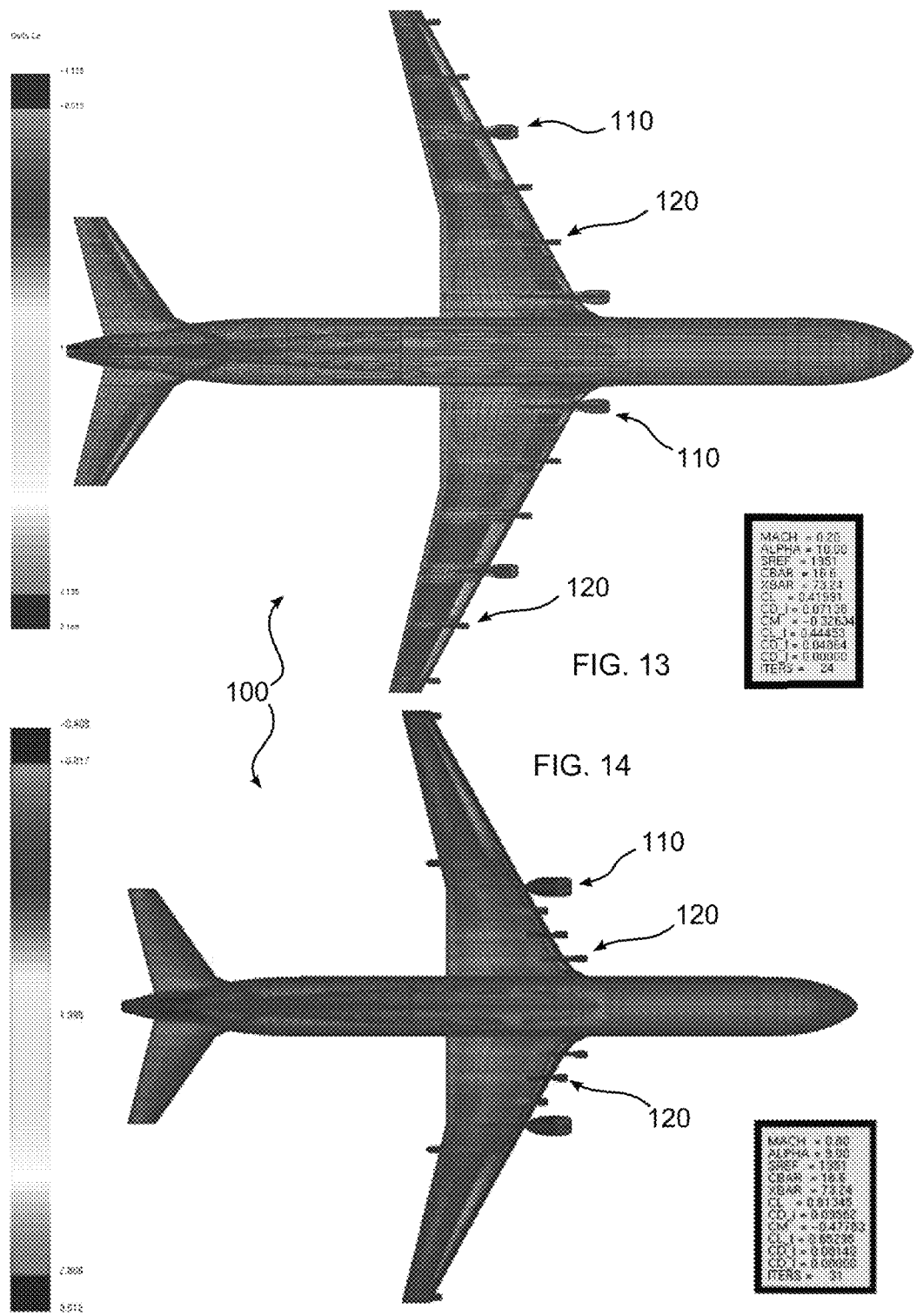
FIG. 13 depicts the aerodynamic analysis of FIG. 12, of an embodiment of the disclosure having 2 generators and four propulsors per wing.
FIG. 14 depicts the aerodynamic analysis of FIG. 12, of an embodiment of the disclosure having 1 generators and three propulsors per wing, all of which are oriented close to the wing root.
Figure 15:
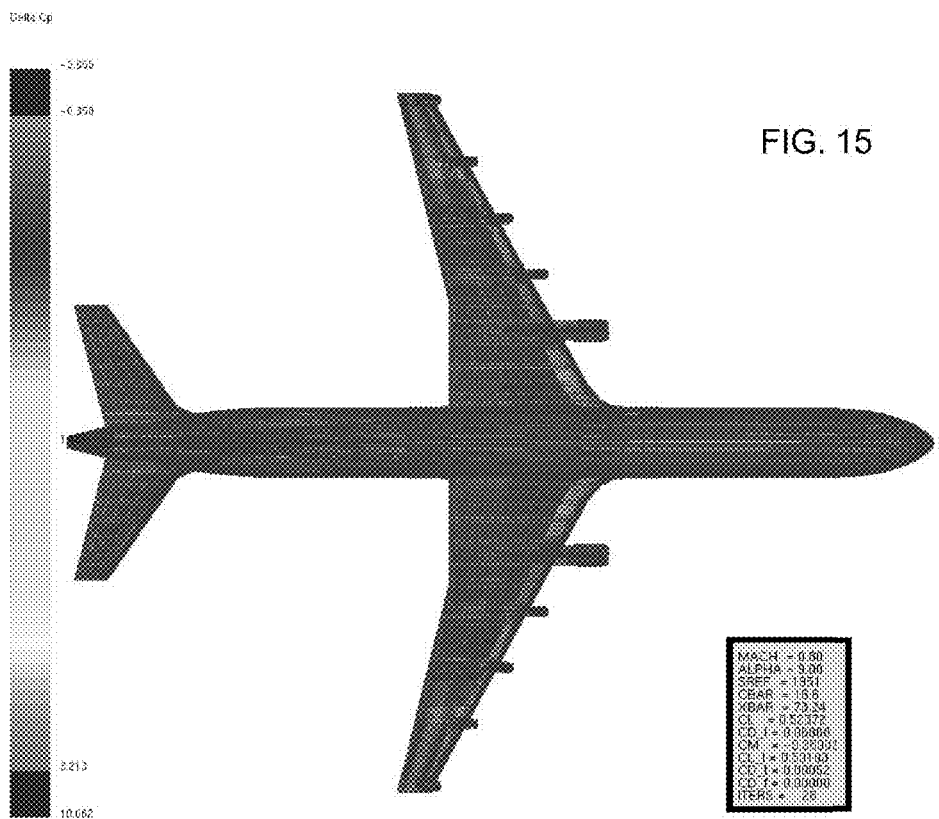
FIG. 15 depicts the aerodynamic analysis of FIG. 12, of an embodiment of the disclosure having a single generator positioned close to the wing root, and four propulsors evenly spaced along the wing, including a propulsor positioned proximate the wing tip.
Figure 16A:
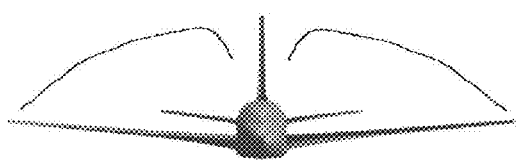
Figure 16B:
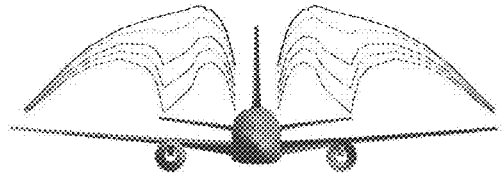
Figure 16C:
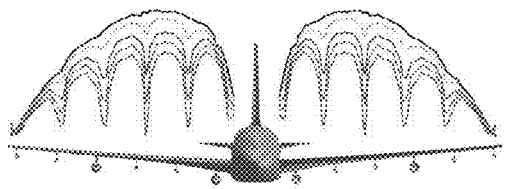
Figure 16D:
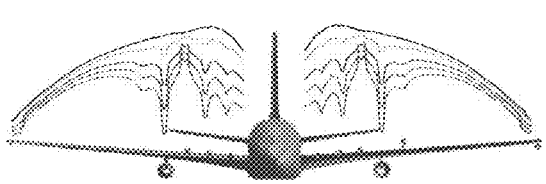

An aerodynamic analysis using the aerodynamic model of the GTM is illustrated in FIGS. 12-15, where FIG. 12 is a baseline GTM that has not been modified in accordance with the disclosure, FIG. 13 is a first embodiment having two generators and two fans, herein also used interchangeably to refer to propulsion devices, on each wing, FIG. 14 is a second embodiment having one generator and three fans, all positioned closer to a centerline of the aircraft 100, and FIG. 15 is a fourth embodiment having an inboard generator and three evenly spaced fans distributed outboard. The analysis assumed all embodiments have the same takeoff thrust and power. It is possible that the fans 120 are of different sizes that generate different takeoff thrust and power. It is further assumed that the fans 120 provide all the thrust, and not the generators 110. It is possible for generators 110 to produce thrust, as well. Moreover, it is assumed that the fans 120 employ thrust reversers that allow a rapid change in the thrust vectors for slowing down an aircraft after touching down on a runway.

FIG. 16 illustrates propulsion interaction with wing aerodynamics. FIG. 16A illustrates a clean wing, and FIG. 16B illustrates the baseline GTM. It may be seen that for the baseline, as well as for embodiments of the disclosure illustrated in FIGS. 16C and 16D, as propulsion devices are added, there is an introduction of flow disturbances, wetted area, and viscous drag. Higher fidelity tools can be used to optimize the propulsion layout and geometry to minimize this effect, for example by changing the size and dimensions of nacelles and pylons.

Figure 17:
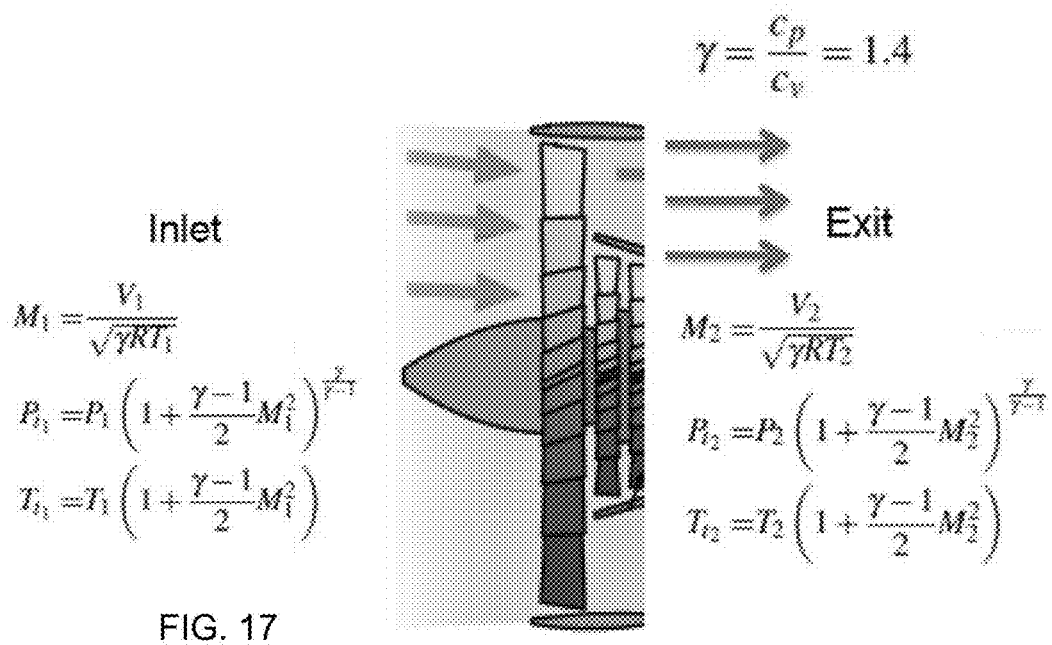
Figure 19:
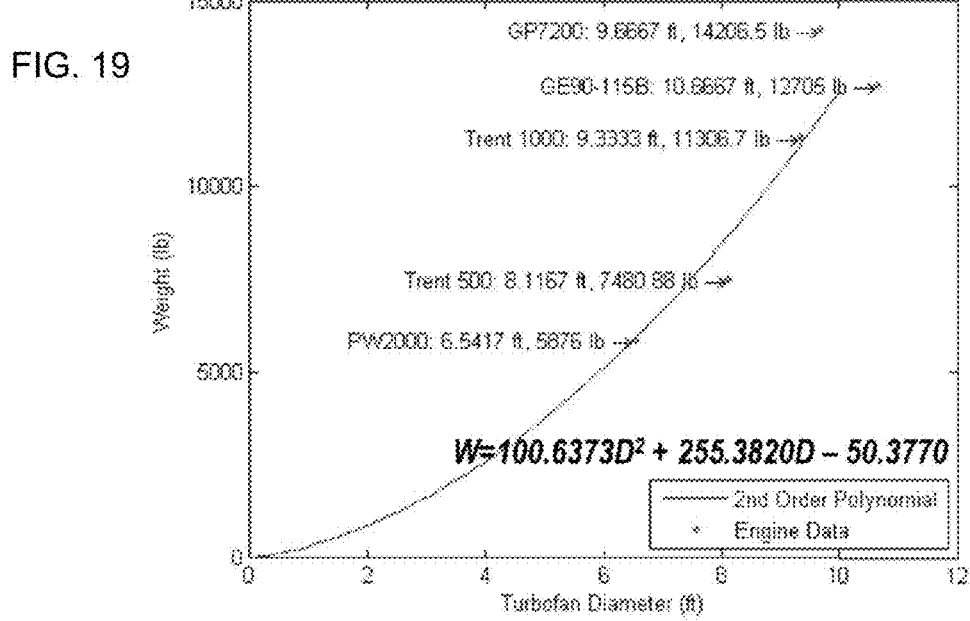
FIG. 19 is a plot of turbofan weight and diameter using the equations of FIGS. 17-18.
Figure 20:
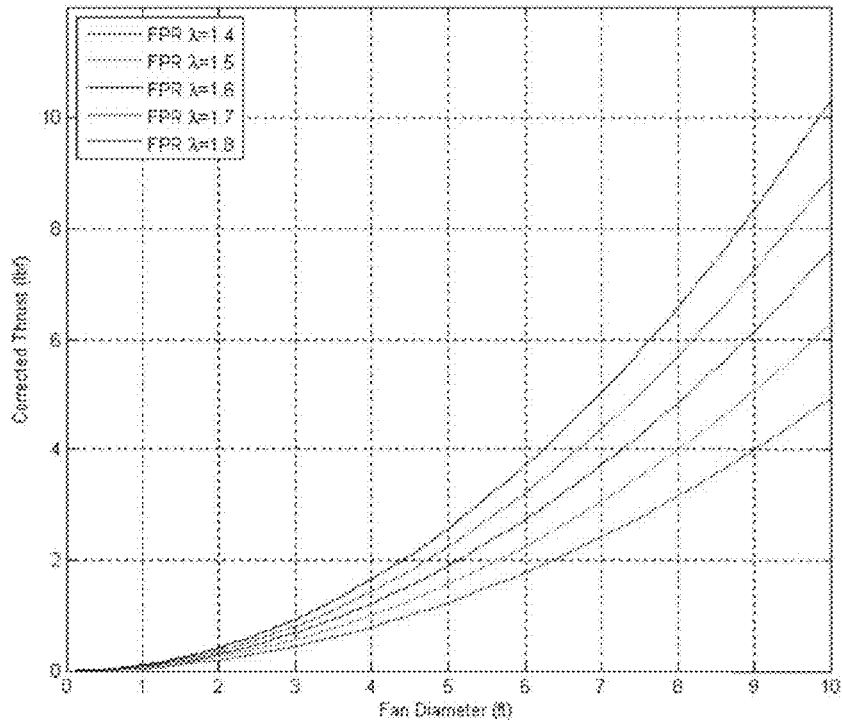
FIG. 20 is a plot of turbofan thrust at sea level for various fan pressure ratios.
Figure 21:
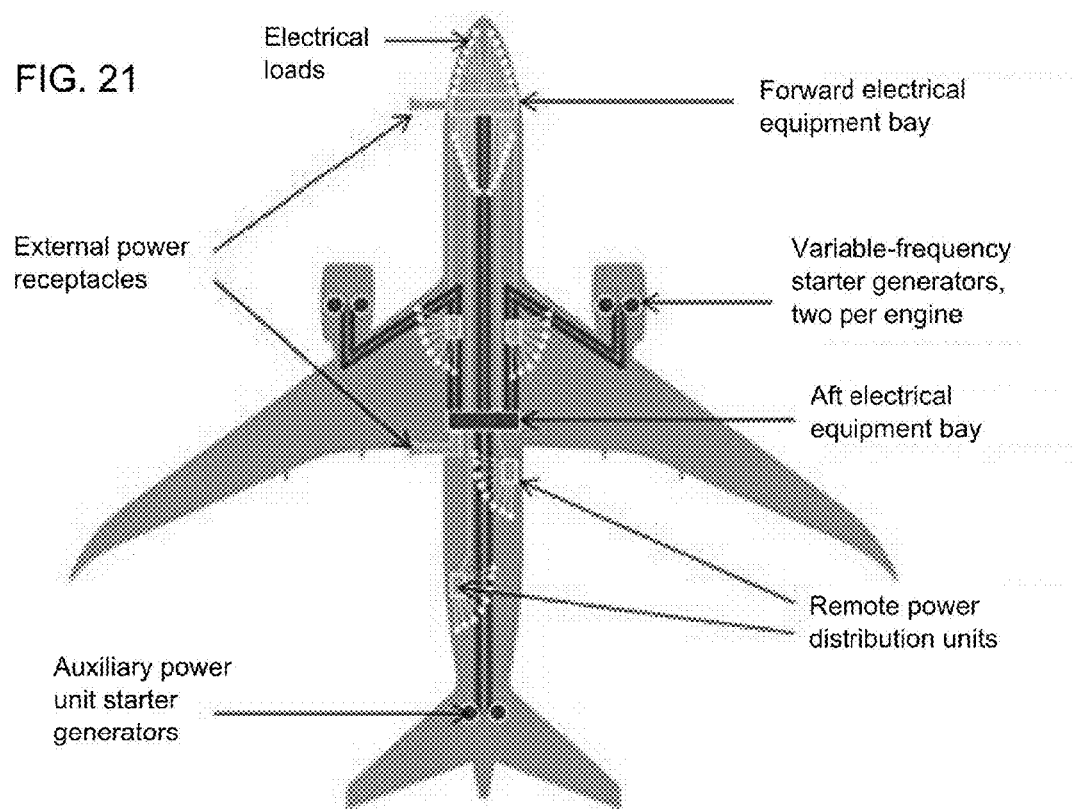
FIG. 21 depicts various components of an electrically propelled aircraft of the disclosure.

Turbofan performance modeling is illustrated in FIGS. 17-19. The model is typically used for modeling turbofan engines, but is also applicable for electric fans of the disclosure. More particularly, the core of the engine or power producing device has been logically decoupled from the turbofan, which produces most of the thrust for a turbofan engine. Accordingly, the fan performance are modeled to determine the relationships between thrust and weight for given diameters and pressure ratios, which are then used to determine the fan size (FIG. 19) needed to achieve the takeoff thrust (FIG. 20) required for the aircraft being modeled. Once these factors are determined, it is possible to calculate parameters for the electric motor. The equations of the disclosure illustrated in FIGS. 17 and 18 form a complement to traditional turbofan calculations. In particular, FIG. 17 describes the inlet and exit flow conditions across the fan 120 which comprise the Mach number, stagnation pressure, and stagnation temperature. These three parameters uniquely determine a flow condition. For a given pressure ratio across the fan 120, the exit stagnation pressure can be determined by the inlet stagnation pressure multiplied by the pressure ratio. For a given fan isentropic efficiency, the temperature ratio can be determined from the pressure ratio. Then the exit stagnation temperature can be determined by the inlet stagnation temperature multiplied by the temperature ratio. The exit Mach number is then determined by the conservation of mass or continuity equation in FIG. 18. The static pressure at the inlet and exit can then be easily determined from the stagnation pressure and Mach number. The fan thrust is computed from the static pressure rise across the fan and the fan diameter and is corrected for the standard sea level condition. FIG. 20 illustrates the fan thrust as a function of the fan diameter for different pressure ratios. FIG. 21 is used to estimate the fan weight using a quadratic correlation of weights of turbofan sections with fan diameters for a number of commercial turbofan engines. This fan weight model can be used in preliminary distributed propulsion design.

It should be understood that any number of propulsion devices, and any number of generators can be connected to a wing in accordance with the disclosure, in consideration of factors including weight, power requirements, and cost, for example.

FIG. 21 illustrates one possible configuration for an aircraft 100 of the disclosure which is configured to support electric fan motors (not illustrated). Such a configuration can be used with any of the four power embodiments illustrated in FIGS. 14-17. More particularly, FIG. 14 illustrates a low voltage battery driving an AC motor, in which a generator 110 provides output to a voltage reducing transformer 142, which produces an output that is further converted by a converter 144 to direct current for charging the battery 146. A motor controller 148 converts DC power from the battery to AC power to drive the motor 120A, an AC embodiment of motor 120.

The generator or auxiliary power unit (APU) may operate at a higher voltage than the thrust-producing device, for example motor 120A, which can be limited in capacity by propeller tip speed constraints. Thus, with respect to transformer 142, a voltage reduction is typically applied. However, the selection of a voltage reducer may also depend on the requirement to windmill the propulsor in a way that enables the recovery of energy in a similar manner as a windmill. In this case, a bi-directional transformer is required to both step down or step up voltage, depending on the role of motor 120A.

In FIG. 23, an embodiment uses a high voltage battery to drive an AC motor. The components are the same as described for FIG. 22, however a DC transformer 150 is provided to reduce the DC voltage as required by motor 120A. In FIG. 24, an embodiment uses a low voltage battery to drive a DC motor. The components are the same as described for FIG. 22, however a DC to DC motor controller 148B is provided to drive a DC motor 120B, a DC embodiment of motor 120. In FIG. 25, an embodiment uses a high voltage battery to drive a DC motor. The components are as described with respect to FIG. 24, however DC transformer 150 is provided to reduce voltage for DC to DC motor controller 148B.

Suitable DC motors are currently available with the highest specific torque for a given weight, and can function effectively at a relatively lower voltage, for example 300 volts. Accordingly, the low voltage battery to DC motor embodiment of FIG. 24 was found to be advantageous. An example configuration is shown in FIG. 26. It should be noted, however, that the other embodiments could prove more advantageous if products are available, or become available, which provide greater power to weight or other advantages, such as reliability or safety, for example.

The operating voltage of the electrical system of the disclosure can be determined in part by the operating voltage of the power-producing device, in this case motor 120A. For devices readily available at the time of this writing, including non-superconducting electrical motors, a high voltage would be 1000 vDC, although this value may change in the future. For high voltage systems, a DC to DC transformer can be used to step down the voltage from the battery to the operating voltage of the electric propulsor. For specific applications, it may be desirable to have an energy storage system (battery or capacitor) operating at a voltage which is outside the range of the power-producing device, and which is changed by a transformer or other voltage altering device.

It should be understood that a mix of fuel burning fans and electric fans can be connected to the aircraft 100. They may all work to propel the aircraft at the same time, or may each only operate during a portion of the mission, or they may serve to supplement or serve as emergency backup for the other. Likewise, different types of propulsion devices can be provided on a wing. Propulsion devices in general, and electric fans in particular, can additionally be provided on a tail portion of an aircraft, and can be mounted on any or all of the wing portions of the tail, including proximate the rudder or elevators. Propulsion devices of the disclosure can be positioned, entirely or in part, forward of the wing, above the wing, below the wing, or behind the wing, and may be mounted to the fuselage or any other portion of the aircraft.

Figure 27:
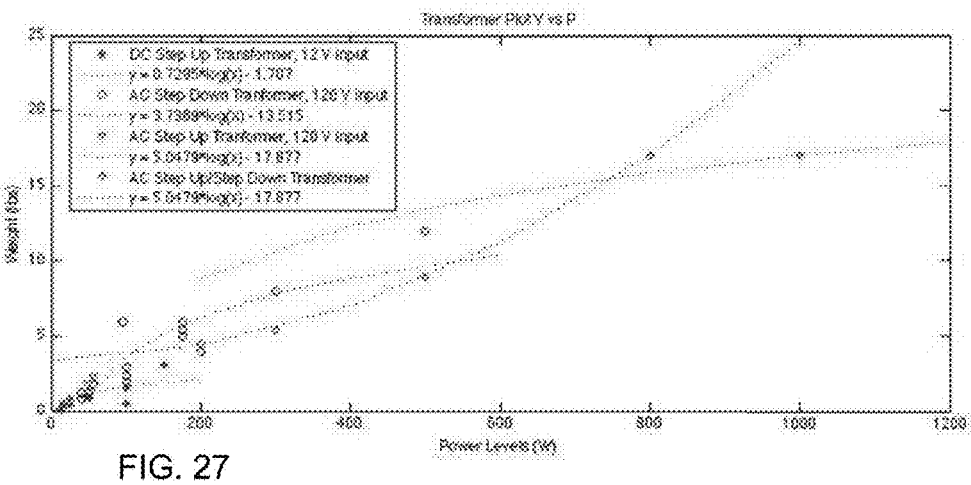
FIG. 27 depicts transformer weight and power for various configurations of an electrically propelled aircraft of the disclosure.
Figure 28:
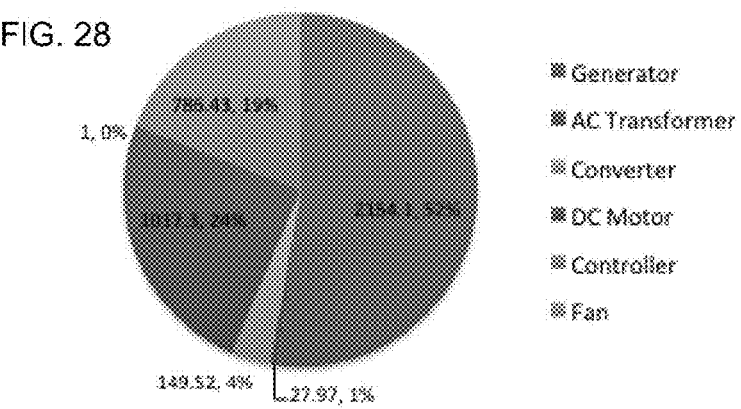
FIG. 28 depicts a pie chart of an illustrative distribution of weight for components of an electrically propelled aircraft of the disclosure.
Figure 29:
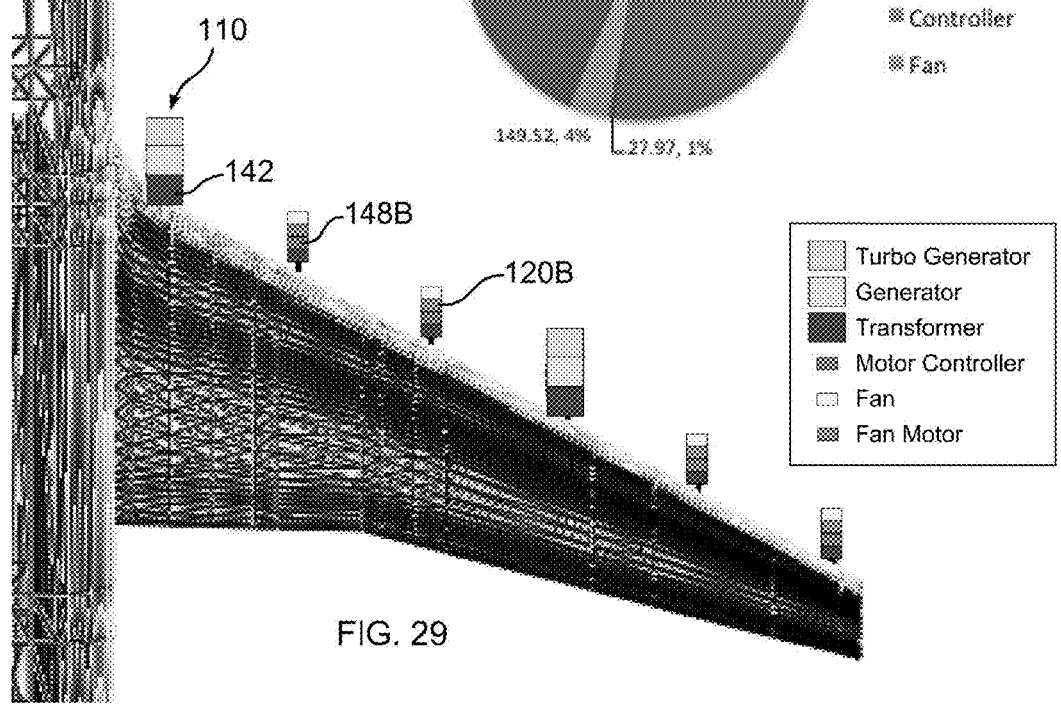
FIG. 29 depicts an arrangement of components relating to electrical propulsion of an aircraft of the disclosure.

FIG. 27 illustrates power to weight for various transformers 142, 150, and other transformers, which can be used with an electric fan motor 120. The calculations shown in the plot are used in considering which of the foregoing embodiments best fit the prototype embodiment of an aircraft 100. FIG. 28 illustrates the contribution of the various components, in pounds, described with respect to FIGS. 22-25 to the total weight of the combined generator and propulsion system. FIG. 29 illustrates the locations of the various components along the wing of a given prototype embodiment.

Figure 30:
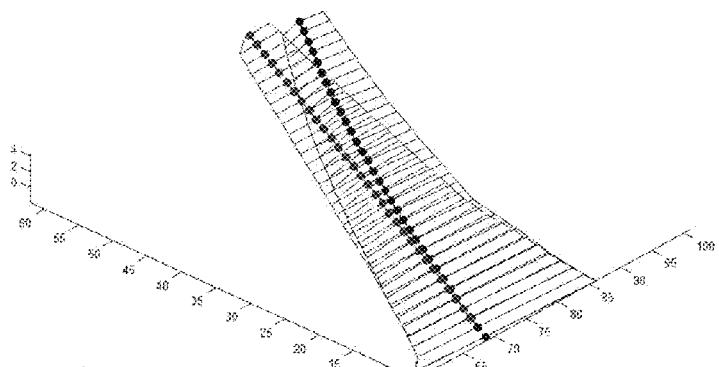
FIGS. 30-31 depict a finite-element model of a flexible wing using geometry generation tools of the disclosure.
Figure 31:
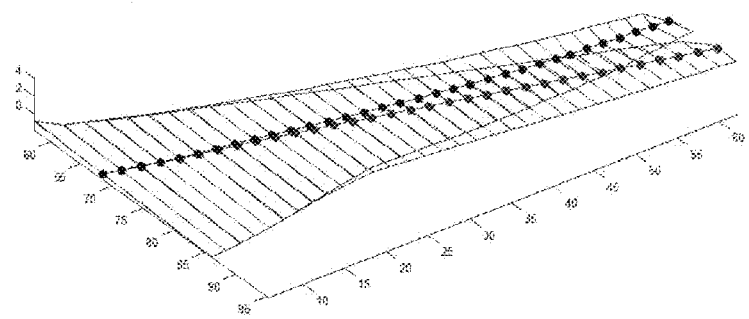

FIGS. 30-33 illustrate structural modeling using the finite element method. More particularly, a finite-element model and geometry generation tools is created in Matlab using a single beam model, taking into account aero-propulsive-elasticity for distributed propulsion wing shaping analysis and unsteady aerodynamics for flutter analysis, as illustrated in FIGS. 30-31. The finite-element model computes flapwise bending, chordwise bending, and torsional deflections.

Figure 32:
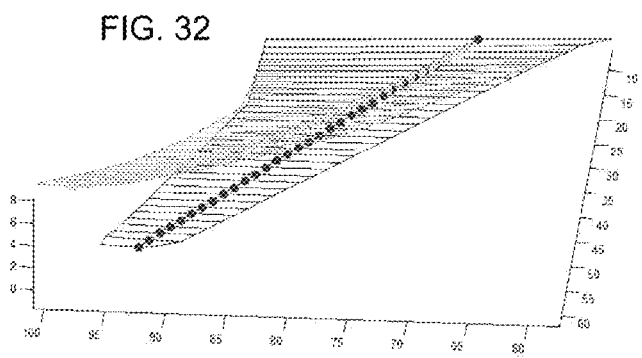
FIGS. 32-33 depict a model of the disclosure illustrating an integrated finite-element aeroelastic model for 6 degrees of freedom deformation capability for a flexible wing of the disclosure.
Figure 33:
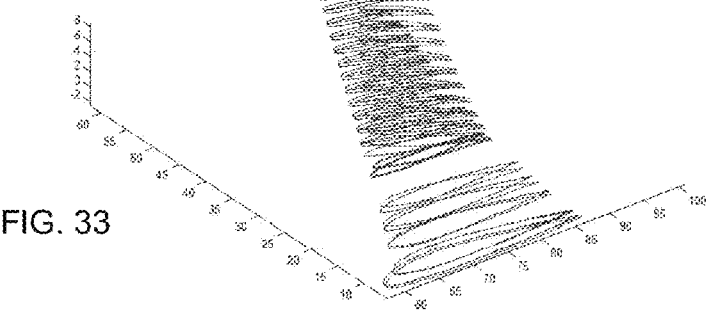

An aeroelastic model and the finite element analysis are integrated to produce a model, reflected in FIGS. 32-33, which illustrates a 6 degree-of-freedom deformation capability for determining wing bending and torsion, particularly due to the thrust vectors of distributed propulsion. For modeling, it is assumed that the generator 110 introduces a nose-down moment as it is mounted forward of the elastic axis and is assumed to not produce thrust. With respect to the propulsion device or electric fans 120, a nose-down moment is produced due to the mass offset forward of the elastic axis, and a nose-up moment is produced under thrust for under-wing mounted distributed propulsion.

Figure 34:
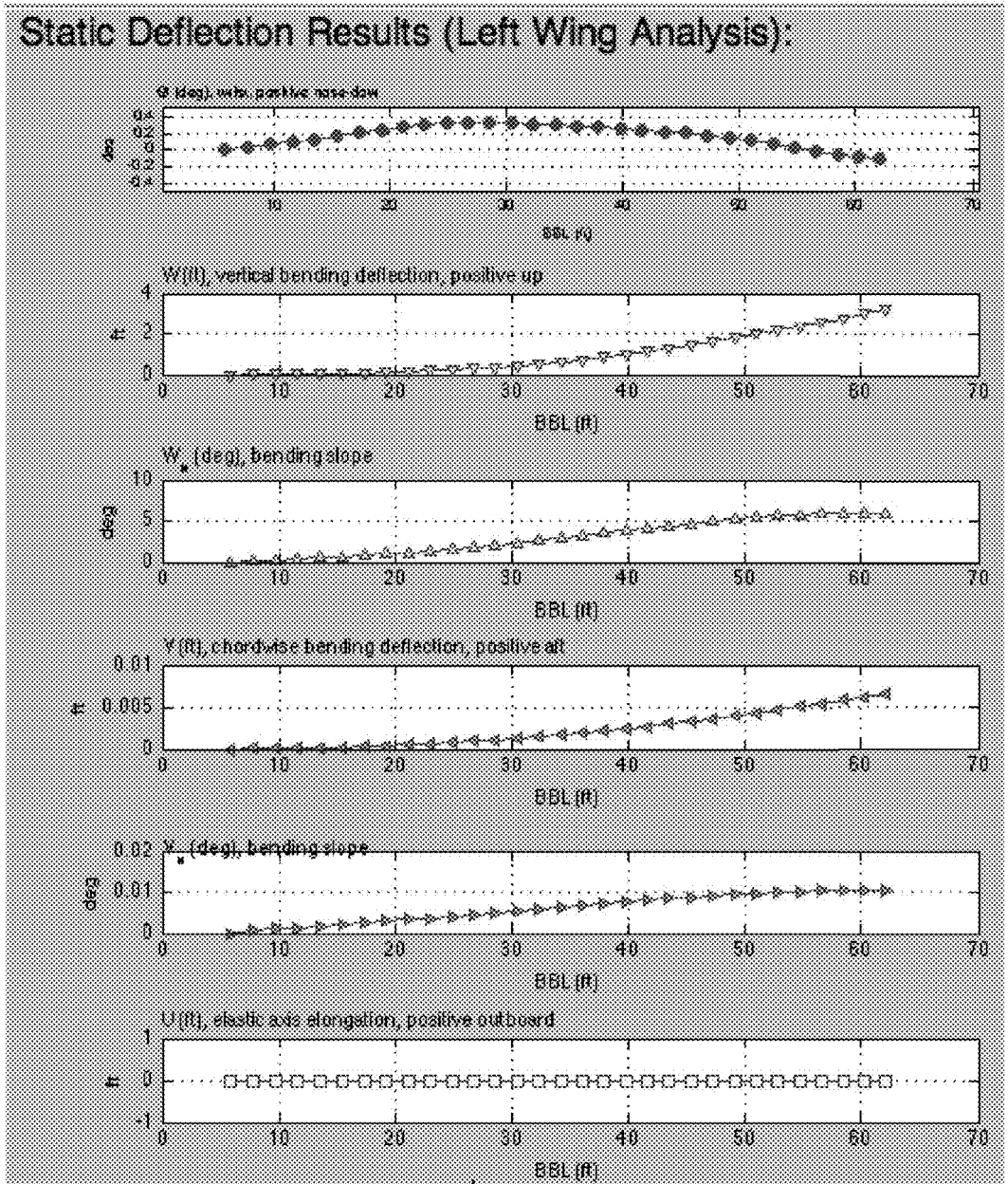
FIGS. 34-35 depict an interactive user interface for a static aeroelastic modeling tool of the disclosure, the modeling tool integrating lift distribution, weight distribution, thrusts distribution, and drag distribution.
Figure 35:
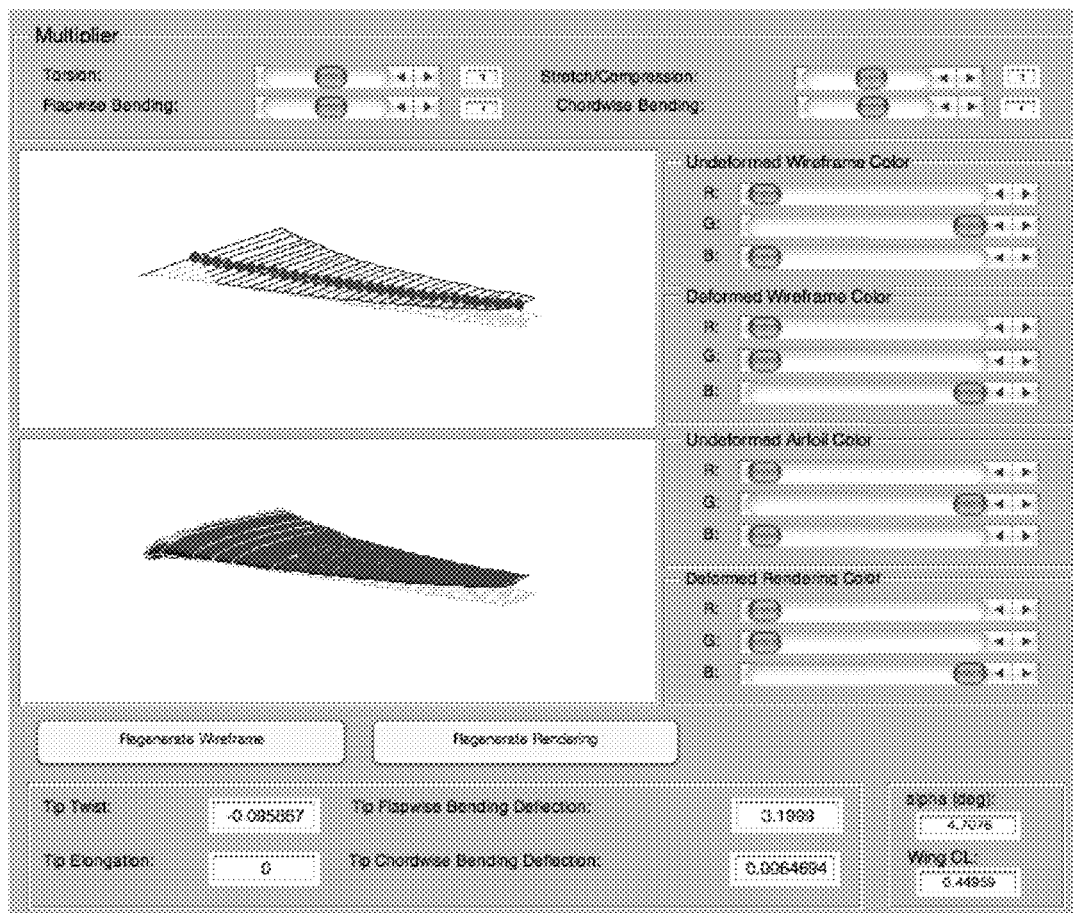

FIGS. 34-35 depict left and right sides, respectively, of a computer display 182, separated for the illustration to more clearly show relevant details. The display represents output of a static aeroelastic modeling software tool 180 of the disclosure, which incorporates the modeling tools described with respect to FIGS. 30-33. The software additionally utilizes calculated lift, weight, thrust, and drag distributions for the propulsion devices along the wing. Software 180 further enables modeling of structurally softening of the wing to enable greater deflection by changing bending modulus or flexural rigidity EI, and torsional rigidity, GJ. Thus, stiffness of the wing 130 affects the aerodynamics of the wing, as the wing-twists and bends due to forces imparted by distributed propulsion, and other factors. Various factors affecting EI and GJ can be adjusted using the labeled sliders shown in FIG. 35, and the resultant deflection is depicted in FIG. 34.

As illustrated in FIGS. 36-37, all of the modeling attributes described herein can be combined to determine the impact of various design changes on the performance of a prototype. In addition, in accordance with the disclosure, a thrust induced lift due to the distributed propulsion can be calculated. More particularly, a thrust induced lift force, calculated in accordance with FIG. 38, incorporates thrust-induced elastic deformation that takes place resulting from changes in the wing shape, and a resultant thrust-induced angle of attack of the deformed wing. The first term relates to how the vertical deflection of the wing, represented by $W_x$, impacts thrust; the second term represents how the twist of the wing, represented by $\Theta$, changes thrust; and the third term represents the effect of the sweep and the dihedral of the wing. More specifically, these terms can be important to capture the aeroelastic-propulsive interactions which are usually neglected in a conventional aircraft design. As the wing twists and bends, the thrust vector for a wing-mounted propulsion device changes with the wing aeroelastic deformation. This effect is called a force follower effect. Accordingly, a lift component is created by the change in the orientation of the thrust vector. The two terms due to $W_x$, and $\Theta$ result in a thrust-induced bending stiffness and torsional stiffness, respectively. These stiffness quantities cause the aeroelastic deformation to be dependent on thrust. In turn, the resultant aeroelastic deformation affects lift, drag, and pitch moment. Moreover, the thrust-induced stiffness can also influence flutter and divergence. FIG. 38 illustrates the thrust-induced lift arising from the aeroelastic-propulsive interaction model. For flexible wing aircraft, if this effect is neglected, the aerodynamic performance and aeroelastic stability can be degraded.

Thrust-induced lift and distributed propulsion wing shaping control can be better understood with reference to FIG. 39, in which a local aeroelastic angle of attack is derived by considering the aircraft angle of attack, the jig shape twist, and wing aeroelastic deflection, including twisting and bending, and the change in aeroelastic angle of attack due to thrust of the distributed propulsion.

Thus, for a flexible wing construction, using many light-weight materials, increasing aeroelastic deflections, which are represented as $W_x$, and $\Theta$, tends to reduce the local angle of attack of the wing. However, in accordance with the disclosure, by adding thrust, it is possible to compensate for this reduced angle of attack, and to actually increase the angle of attack in a controlled manner, that is from nose-down to nose-up twist that helps to increase the local angle of attack of the wing. Accordingly, combining wing flexibility with distributed propulsion, optimal conditions for a given flight condition can be produced. Calculations relating the wing twist and bending to the torsional and bending stiffnesses, mode shapes, and generalized forces are given FIGS. 40 and 41, respectively.

FIGS. 42-43 depict various aircraft 100 configurations of the disclosure, referenced elsewhere herein.

Figure 46:
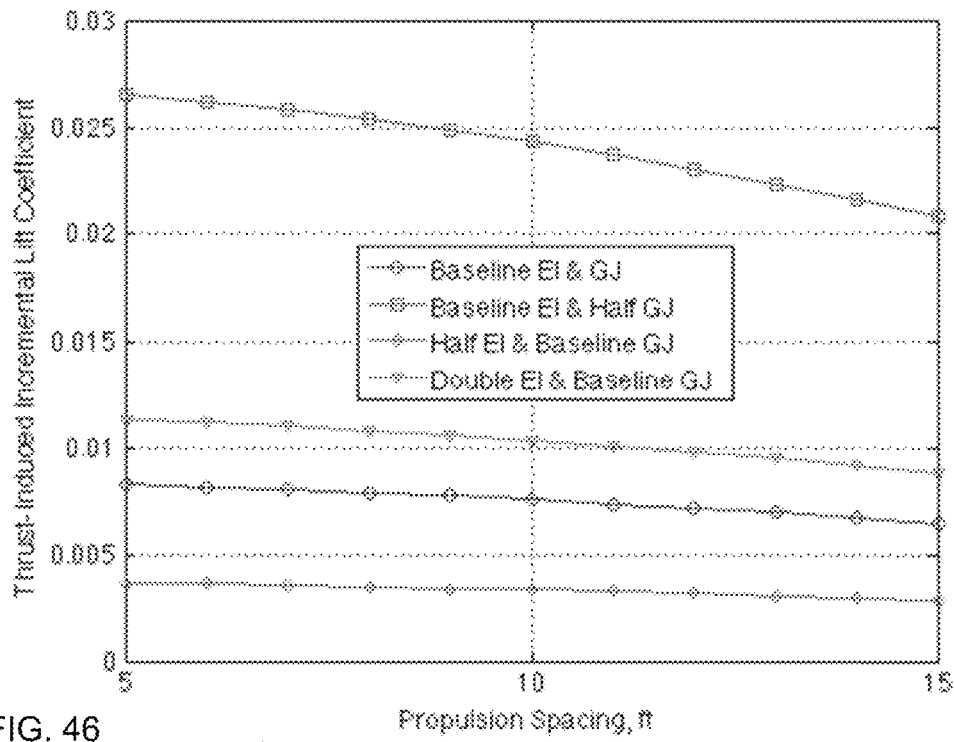
FIG. 46 is a plot of thrust-induced lift and propulsor spacing for various values of bending (EI) and torsional stiffness (GJ)

With reference to FIGS. 44-47, the thrust-induced lift contribution is described by FIG. 44. The first two terms constitute a standard lift expression as a function of the angle of attack. The last term is a novel term that captures the thrust-induced lift derived from the aeroelastic-propulsive interaction model. Using as an example the aircraft 100 design of FIG. 45, the sensitivity of thrust-induced lift due to propulsion spacing can be modeled. Arrow "A" indicates the origin of spacing measurements. The effects of reduced bending stiffness (EI) and torsional stiffness (GJ) can be evaluated, given various uniformly spaced propulsion devices as measured inboard from the wingtip, where thrust is distributed along the wingspan. As can be seen in FIG. 46, thrust-induced lift increases with decreased torsional stiffness (GJ), but decreases with decreased bending stiffness (EI). The nose-up pitching moment due to under-wing mounted distributed propulsion causes the wing to twist nose-up. As the torsional stiffness decreases, the nose-up twist increases along with the local angle of attack. This results in an increase in the vertical component of the thrust vector which contributes to the thrust-induced lift. On the other hand, as the bending stiffness decreases, the wash-out nose-down twist due to bending increases. This has an effect of reducing the thrust-induced lift. The torsional stiffness has a more pronounced effect on thrust-induced lift than the bending stiffness.

Figure 47:
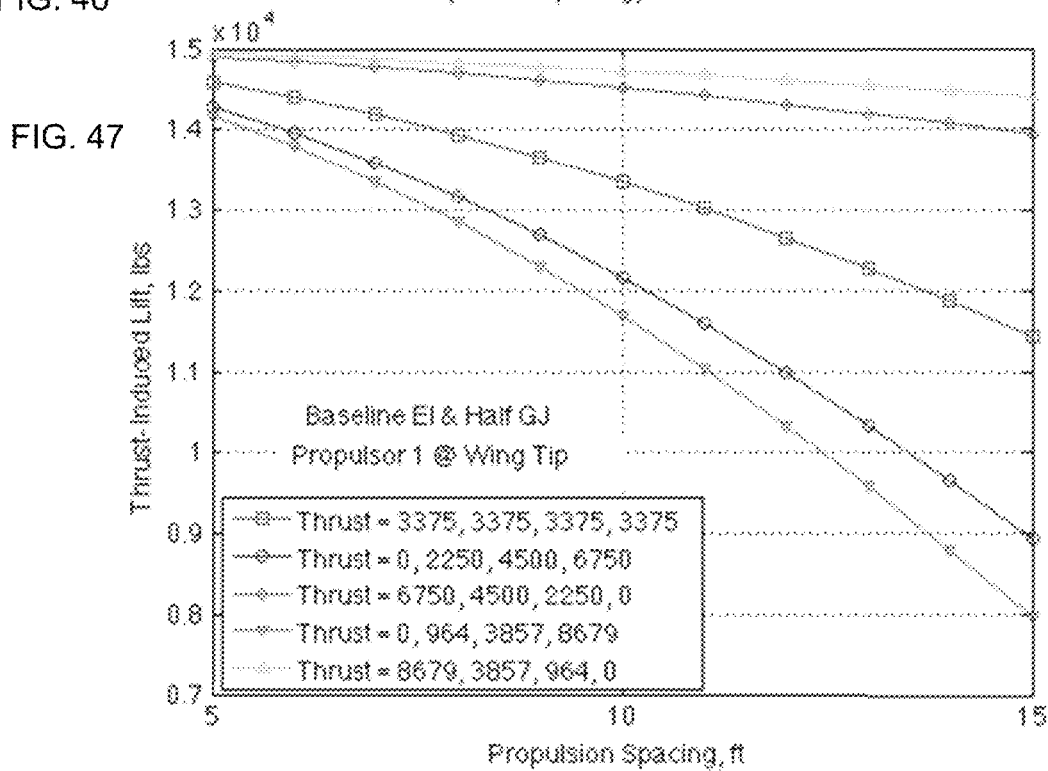
FIG. 47 is a plot of thrust-induced lift and propulsor spacing, for various distributions of thrust along the wingspan.

FIG. 47 illustrates the thrust-induced lift as a function of the thrust variation along the wing span and the placement of the propulsion devices. Increasing thrust toward outboard results in the largest increase in thrust-induced lift, which amounts to almost 15,000 pounds of additional thrust-induced lift, a substantial increase by reducing the torsional stiffness in half and placing propulsion devices 5 feet apart starting from the wingtip. Increasing the propulsion spacing from the wing tip has an effect of reducing the thrust-induced lift.

In FIG. 47, almost 15,000 pounds of additional thrust induced lift is also achieved by varying the thrust, and in some cases parabolically varying the thrust, across propulsion devices spaced along the wing.

Figure 48:
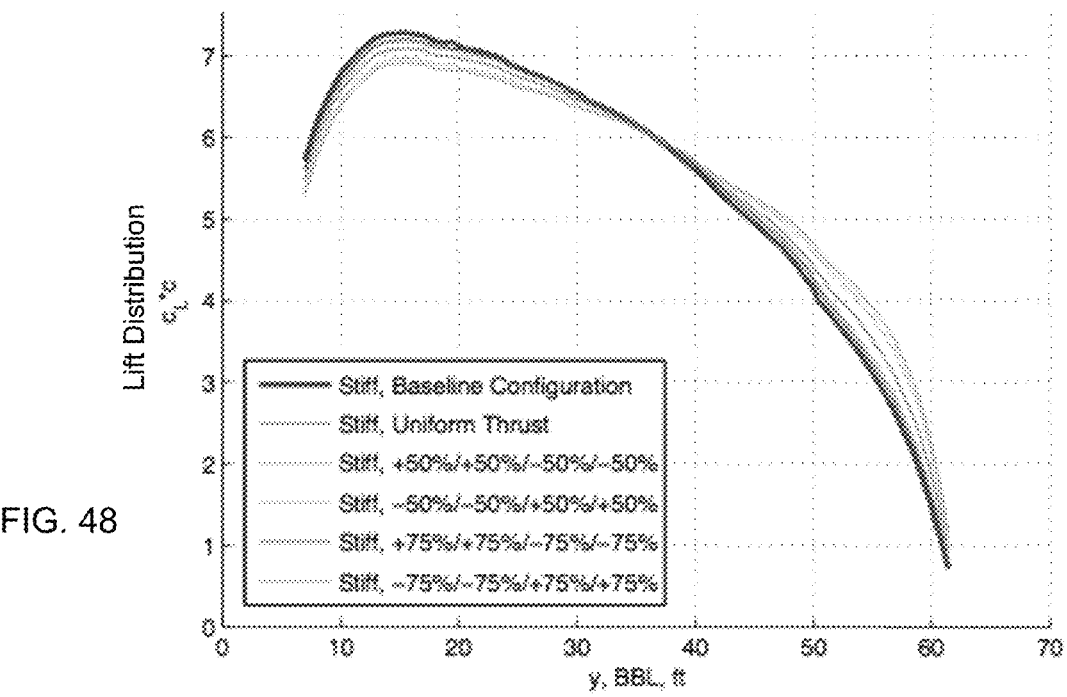
Figure 49:
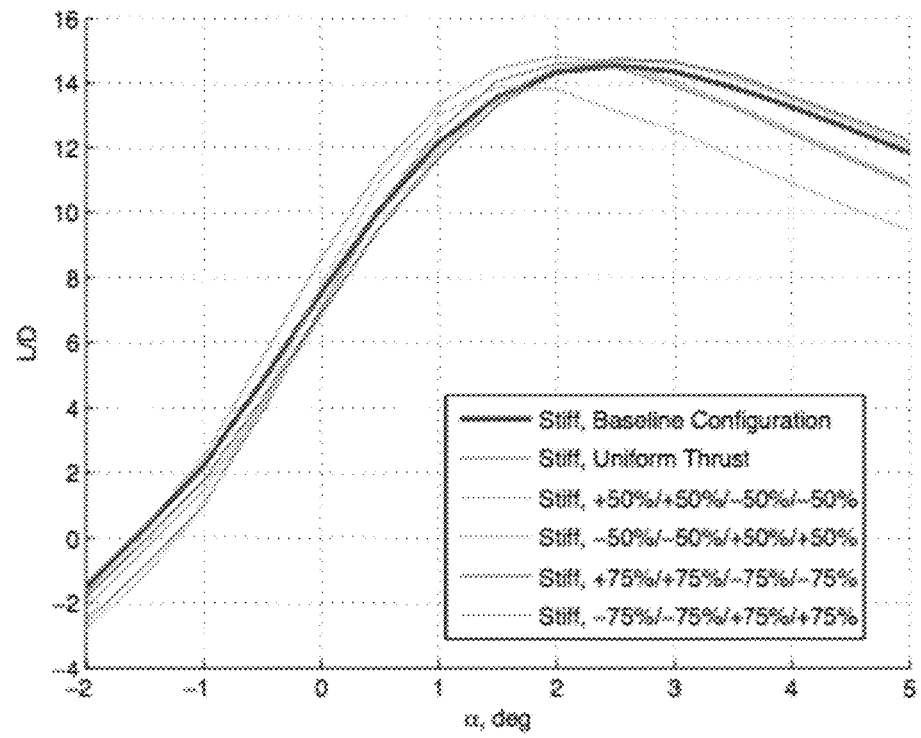
Figure 50:
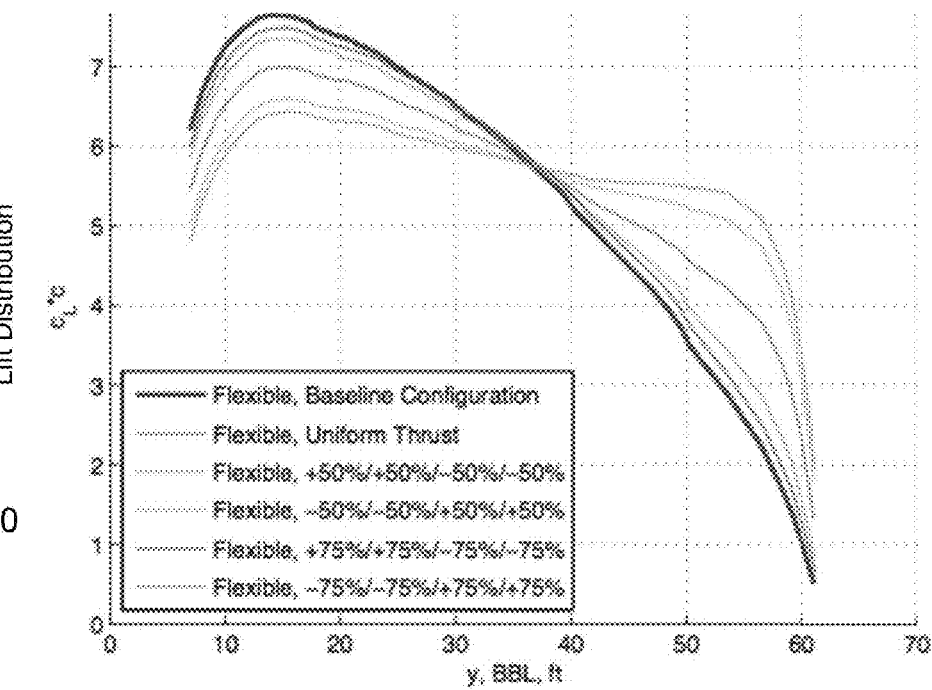

In FIGS. 48-51, effects of wing stiffness on spanwise lift distribution and L/D are illustrated. FIGS. 48-49 reflects a stiff wing, and more particularly the stiffness of the baseline model, and FIGS. 50-51 reflect a flexible wing, and more particularly a 50% reduction in GJ stiffness. It is observed that aerodynamic efficiency is sensitive to wing bending and torsional stiffness, and local propulsive forces and moments. In FIGS. 48 and 50, the spanwise lift distribution is plotted and illustrates that changing the thrust distribution across the wingspan can cause a significant change in lift distribution, hence L/D. In FIG. 50, a triangular shape lift distribution reflects a potentially more structurally efficient design. An advantageous trade-off can be established between structural efficiency and aerodynamic efficiency by changing flexibility and thrust distribution. Therefore, according to the present disclosure, distributed propulsion can also be used for load alleviation control for flexible wing aircraft during maneuvers such as a coordinated turn maneuver.

Figure 51:
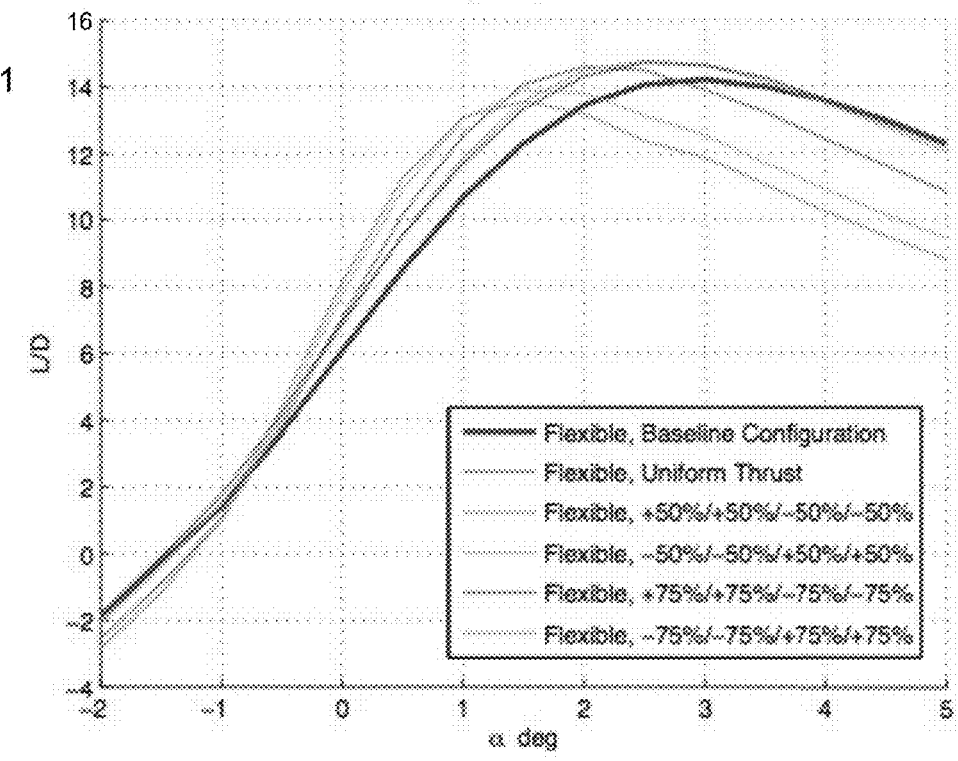

In FIGS. 49 and 51, aerodynamic efficiency is measured using the metric L/D. It can be seen in both models, and particularly the flexible model of FIG. 42, that a higher L/D can be achieved for a given positive angle of attack.

Figure 52:
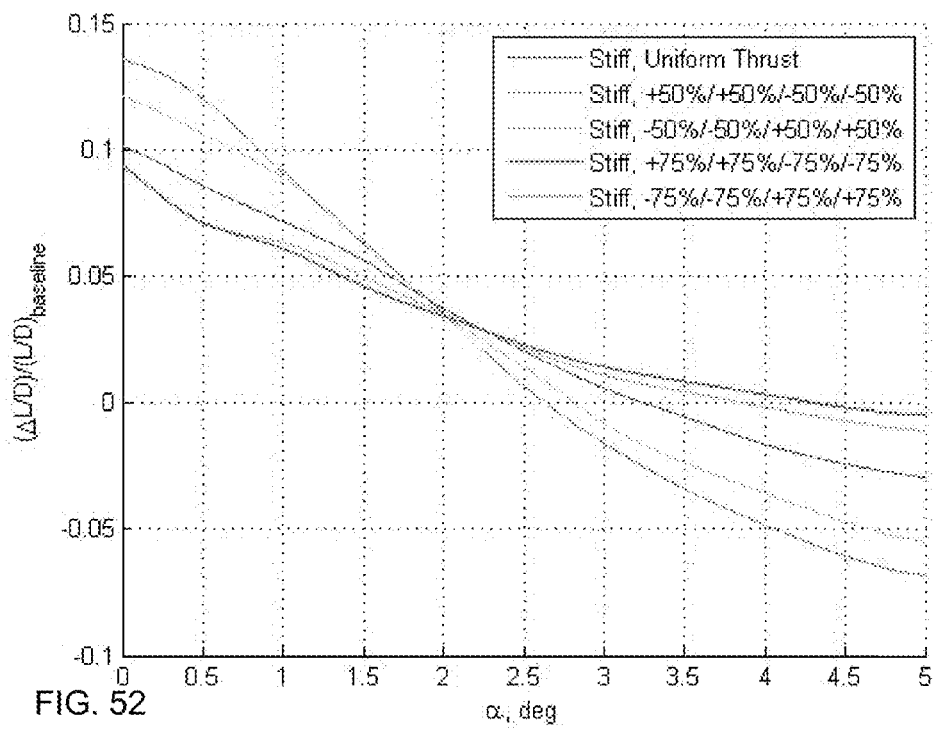
Figure 53:
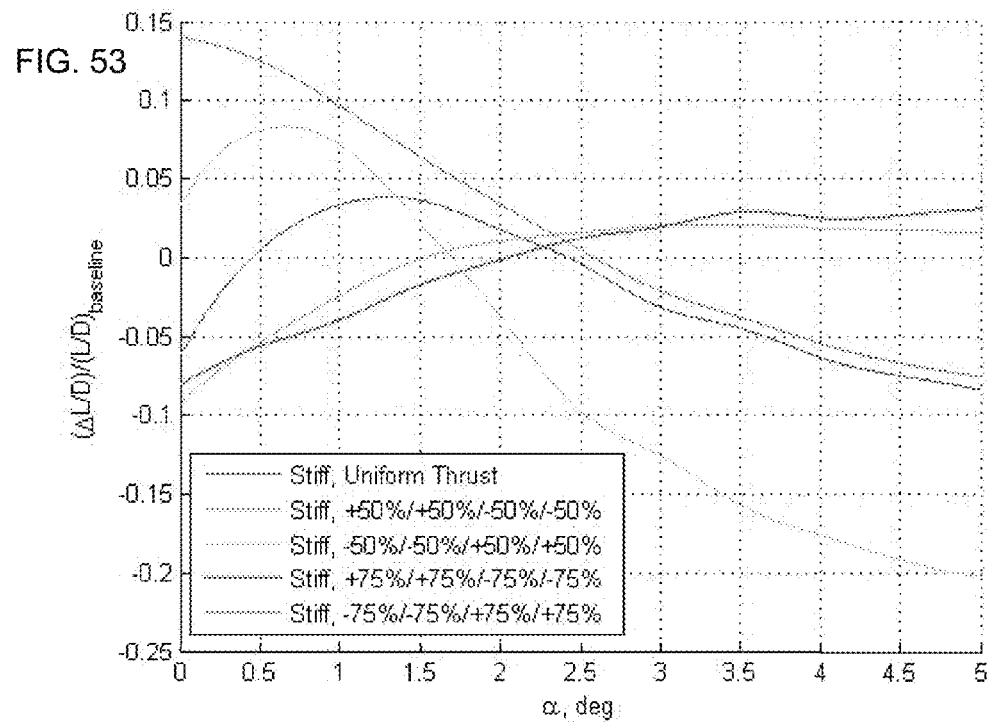
Figure 54:
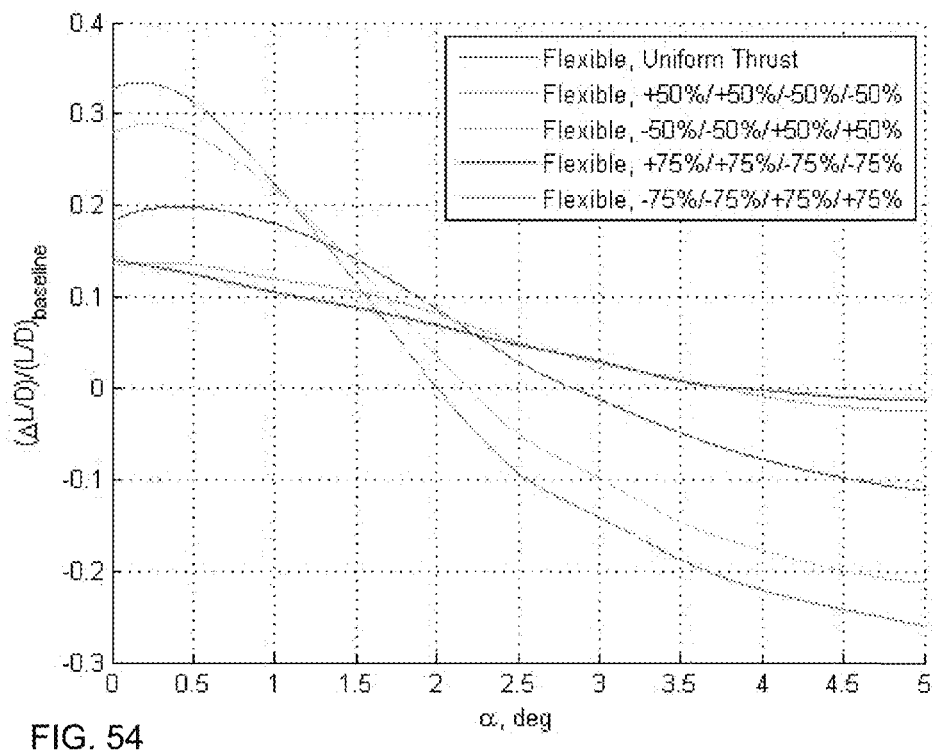
Figure 55:
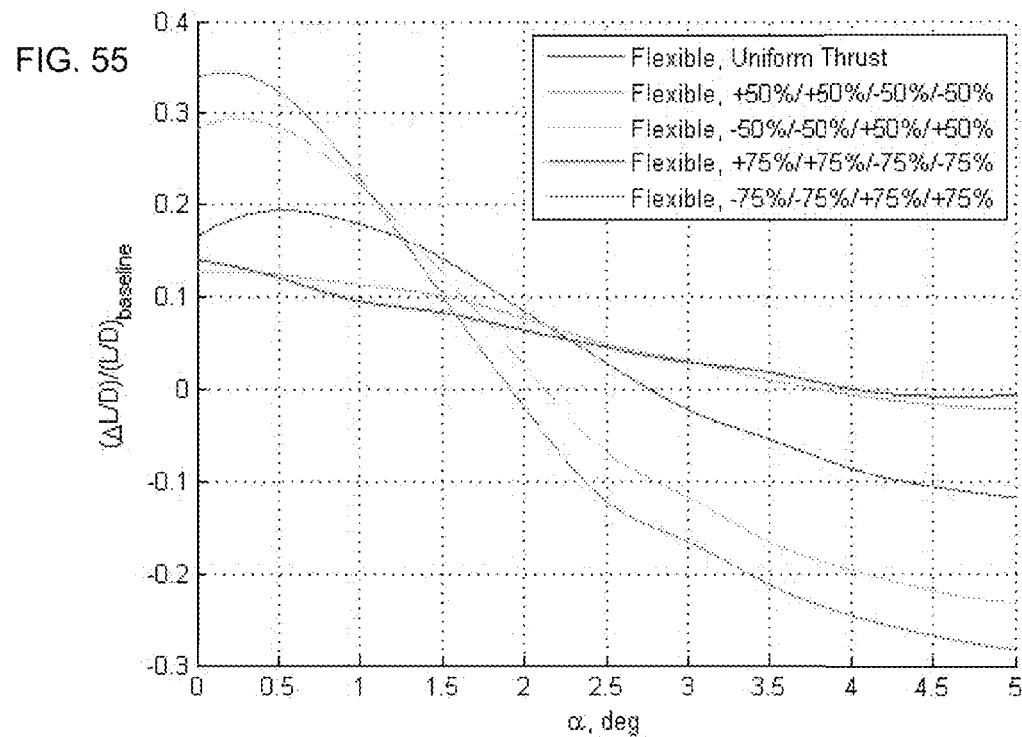

In FIGS. 52-55, the relative improvement in L/D over the baseline GTM is illustrated. In FIGS. 52 and 54, the relative improvement in L/D for the aircraft of FIG. 42 which has a single generator is shown, and in FIGS. 53 and 55, the relative improvement in L/D for the aircraft of FIG. 43 which has two generators is shown. FIGS. 52-53 show the results for a stiff wing corresponding to the baseline GTM, and FIGS. 54-55 show the results for a flexible wing, corresponding to a 50% reduction in torsional stiffness as compared to the baseline GTM. In FIGS. 52-55, varying thrust distribution along the wing is accounted for the four propulsion devices at various angles of attack. It may be seen that for portions of the flight mission, substantial improvements in L/D are achievable, and particularly for the flexible wing configurations. It is noted that L/D is calculated in these examples to include viscous drag as well as induced drag, and has corrections for compressibility drag.

FIGS. 56 and 58 illustrate a potential of trajectory optimization for minimizing fuel over the course of a mission including a climb, cruise, and continuous descent, based upon optimal control theory. The model used an operational empty weight of 175,000 pounds carrying 25,000 pounds of fuel, and a maximum thrust climb along an optimal singular arc according to the singular arc formula in FIG. 57.

The singular arc optimal control according to FIG. 57 dictates that the minimum fuel climb trajectory from climb-out to cruise altitude in accordance with the trajectory shown in FIG. 56. The trajectory can be comprised of multiple segments but only three are illustrated. The first segment is the climb-out segment along which the aircraft accelerates and climbs at a maximum lift coefficient and maximum thrust until it intersects the singular arc segment which is described by a complex function that relates airspeed V and altitude h, and takes into account the aircraft performance parameters; namely the specific excess thrust F, the thrust specific fuel (or energy) consumption c, and thrust T. The specific excess thrust F is defined in according to the following equation $$F(V, h, W) = \frac{T(V, h) - D(V, h)}{W}$$

where T is the distributed thrust, D is the aircraft drag force, and W is the aircraft weight, all of which are functions of the airspeed V and altitude h as well as the aeroelastic deflection of the flexible wing. Along the singular arc segment, the aircraft lift coefficient is continuously reduced in a controlled manner to maintain the correct relationship between the airspeed and altitude while the thrust varies accordingly. The aircraft continues to climb along the singular arc segment until it intersects the final segment when it nearly achieves the desired cruise altitude and airspeed. Then the aircraft departs from the singular arc segment and follows the final segment until it reaches desired airspeed and altitude.

In accordance with the singular arc minimum-fuel optimal climb, the baseline GTM aircraft burns about 3,100 pounds of fuel during the climb. The continuous descent approximates as an optimal climb with the same negative excess thrust. FIG. 58 shows the aircraft weight as it climbs along the optimal trajectory.

Figure 59:
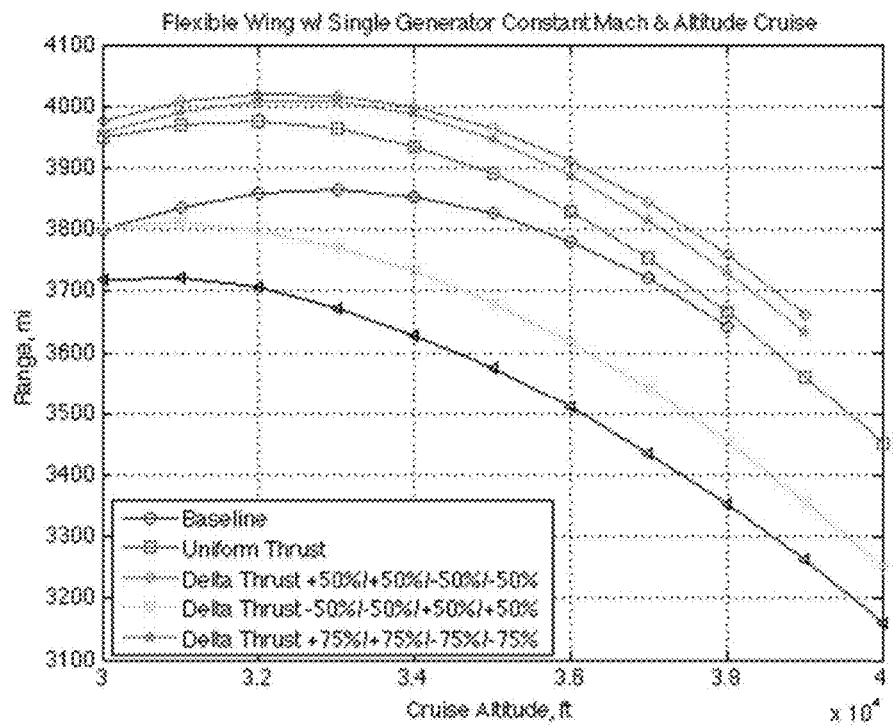
Figure 60:
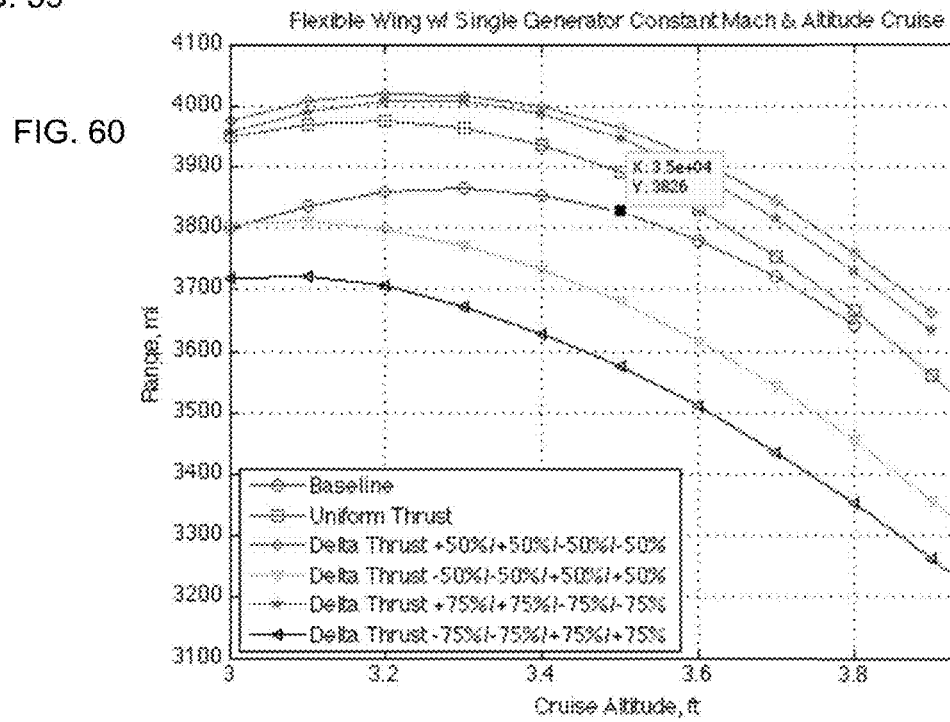

The cruise range analysis is shown for the baseline stiff wing and flexible wing GTM in FIGS. 59 and 60, respectively, each aircraft 100 having a single generator (FIG. 42). Two types of cruise are considered, cruise at constant Mach and altitude, and cruise at constant Mach and angle of attack while the altitude is varied to achieve a maximum L/D. In each case, the baseline GTM is considered for the single generator configuration under uniform thrust and the various thrust distributions along the wing span. FIG. 59 reveals that wing shaping control using distributed propulsion with a single generator according to FIG. 42 achieves better cruise range than the baseline aircraft without distributed propulsion. FIG. 60 reveals that while there appears to be some loss of cruise range due to the flexible wing as a result of using non-optimal jig-shape twist, those losses can largely be recovered by varying thrust along the wing to improve L/D, hence cruise range. The Breguet's range equation, shown in FIG. 61, and a formula for specific thrust fuel consumption for turbofan engines, shown in FIG. 62, are used in the analysis.

Figure 64:
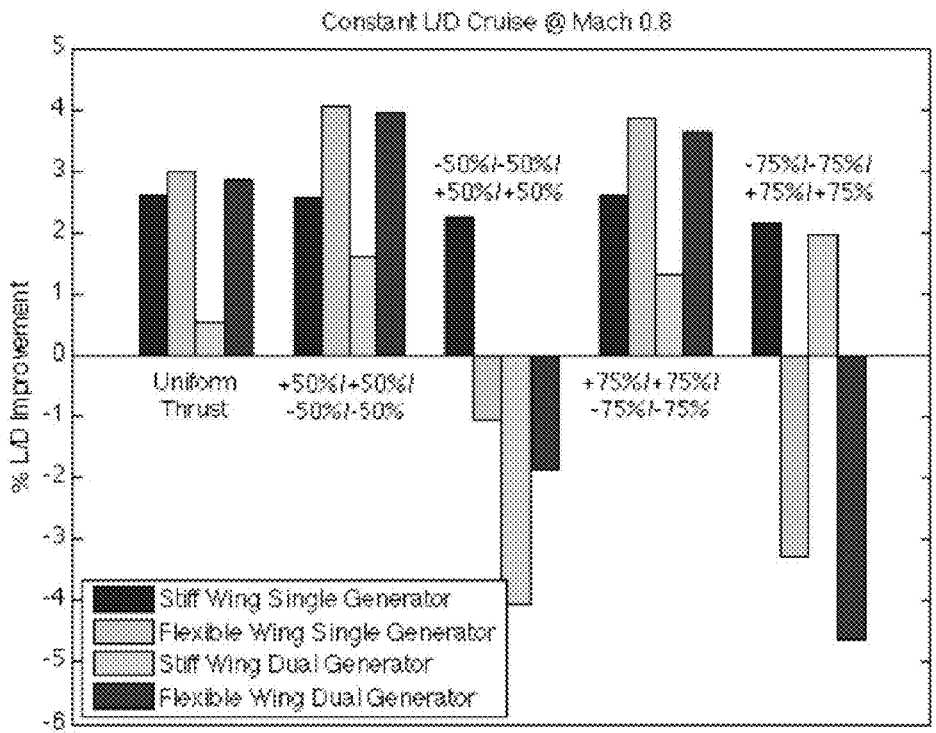
FIG. 64 is a plot of data of FIG. 63.

In FIG. 63, the improvements in L/D are summarized for various configurations of stiff and flexible wings, single and dual generator configurations, and various distributions of thrust. As can be seen in FIG. 63 and a corresponding plot in FIG. 64, a significant increase in L/D, as much as about a 4%, could be achieved for a plurality of the configurations which include flexible wings, accounting for induced and viscous drag, and including corrections for compressibility. FIG. 63 shows that increasing thrust towards outboard generally results in improved L/D. Thus, distributed propulsion concepts could further include unequal thrust-producing propulsion devices and that these devices are placed near or at wing tip to take advantage of aero-propulsive-elasticity for the aerodynamic benefits. This is in contrast to the conventional aircraft design practice of placing engines near the wing root to minimize adverse effects of propulsive interaction with wing aeroelasticity. Moreover, another potential benefit with having a propulsion device near the wing tip is the reduced wing tip circulation that could reduce induced drag as such a device could act like a winglet.

Larger improvements in L/D are possible with further optimization the various parameters and permutations disclosed herein, including, at least, the number and types of propulsion devices; their location in relation to the wing airfoil section; their location along the wing span; the flexibility of the wing span; the flexibility of the wing at various locations, including in relation to the location of propulsion devices; fan size; fan and generator weights and capacities; and wing shape. The applicability of this concept extends to other overall aircraft designs.

Figure 65:
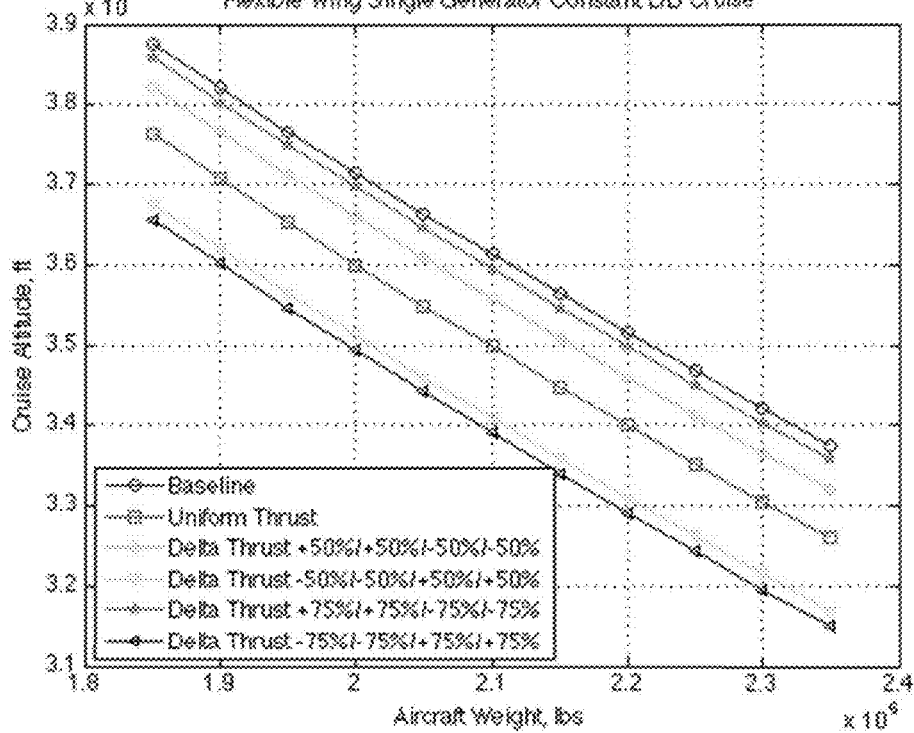
FIG. 65 is a plot cruise altitude and aircraft weight, for various distributions of thrust along the wingspan, to illustrate maximum L/D cruise trajectories, for an aircraft embodiment of the disclosure having a single generator and four propulsors per wing, and a flexible wing.
Figure 66:
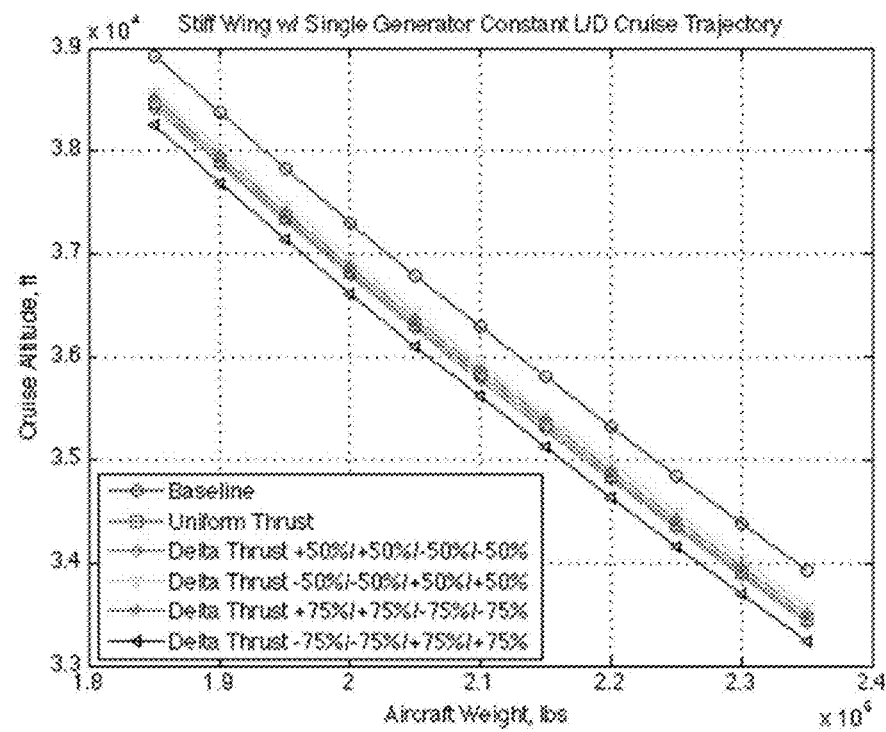
FIG. 66 is a plot as in FIG. 66, but for a stiff wing.

FIGS. 65-66 show the aircraft weight variation along the maximum L/D cruise trajectories. In particular, climb-cruise altitude as a function of aircraft weight for a single generator configuration (FIG. 42), for stiff and flexible wings, respectively, is illustrated. It may be seen from the figures that distributing thrust along a flexible wing enables a wider range of optimal cruise flight trajectories for an aircraft 100. More particularly, it can be seen that by changing thrust distribution along a flexible wing, an optimally efficient cruise altitude over a substantially greater range of cruise range can be selected, as compared to a stiff wing.

Figure 67:
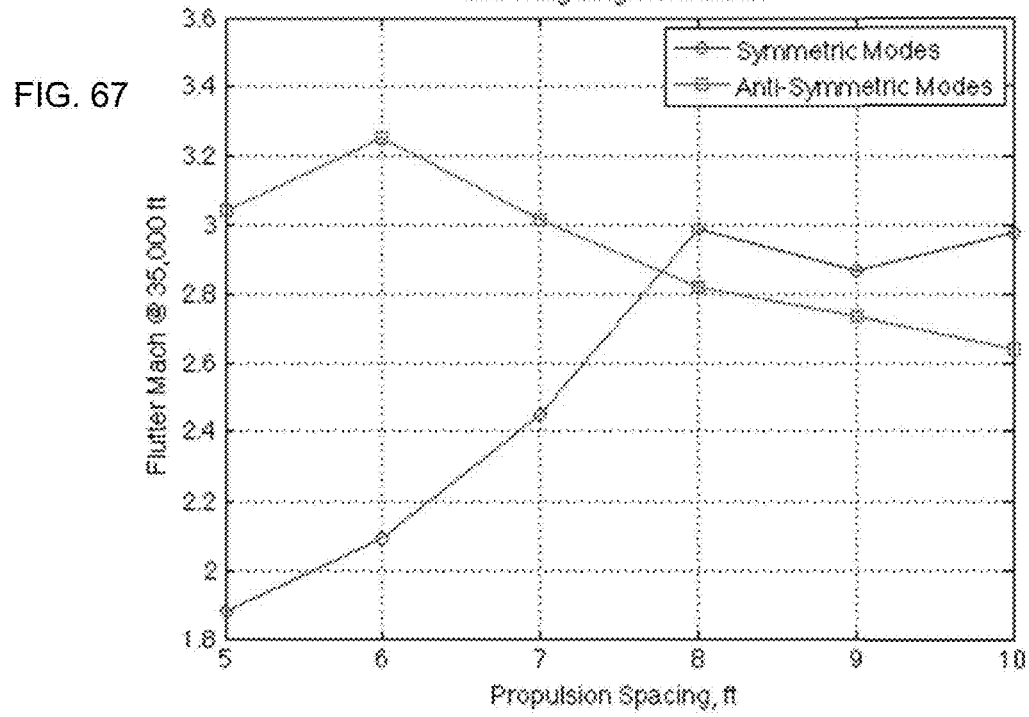
FIG. 67 is a plot of flutter and propulsor spacing, for symmetric and anti-symmetric modes of an aircraft embodiment of the disclosure with 1 generator near the wing root, and 4 fans equally spaced inboard from the wingtip, for a stiff wing.
Figure 68:
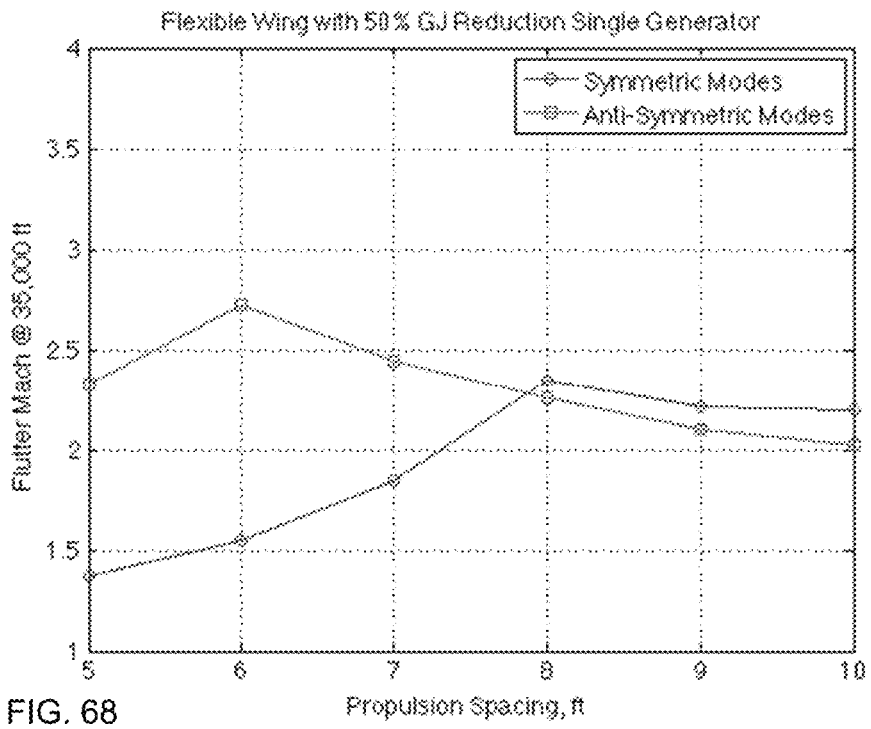
FIG. 68 is a plot as in FIG. 66, but for a flexible wing.

FIGS. 67-68 concern the nature of aeroelastic stability of a distributed propulsion design. In particular, flutter is a destructive vibratory motion of a wing structure resulting from the aerodynamic interaction with structural dynamics of the wing. Consequently, flutter must be avoided at all cost in aircraft design. Aircraft certification as required by FAA requires meeting a flutter speed clearance of at least 15% over the dive speed, or the maximum operating speed when an aircraft is in a dive. The dive speed generally is greater than the maximum cruise airspeed. FIGS. 67-68 show the flutter speed in terms of Mach number at a typical cruise altitude of 35,000 ft as a function of the propulsion device spacing for symmetric and anti-symmetric modes. The symmetric modes are vibration mode shapes of a wing structure with the left wing and right wing having the same motion in phase. For example, a symmetric bending mode of a wing is such that both the left and right wing deflect vertically in the same direction. The anti-symmetric modes are vibration mode shapes of a wing structure with the left wing and right wing having the opposite motion. For example, an anti-symmetric bending mode of a wing is such that the left wing and right wing deflect vertically in the opposite direction. For the baseline stiff wing GTM configuration with a single generator, the minimum flutter speed occurs at about Mach 1.9 corresponding to a symmetric mode, as shown in FIG. 67. This flutter speed is well above the dive speed of a typical transport cruising at the maximum cruise airspeed of Mach 0.8. The effect of the generalized stiffness is apparent in FIG. 68 for the flexible wing GTM configuration with 50% reduction in the torsional stiffness. As the generalized stiffness decreases, the flutter frequency decreases according to the following relationship:

$$\omega = \sqrt{\frac{K}{M}}$$

Thus, for the flexible wing GTM, the minimum flutter speed decreases to about Mach 1.4 which still well exceeds the dive speed of a typical transport. Thus, it is amply evident from FIGS. 67-68 that distributed propulsion concepts of the disclosure can be designed judiciously to meet flutter clearance requirements.

Figure 69:
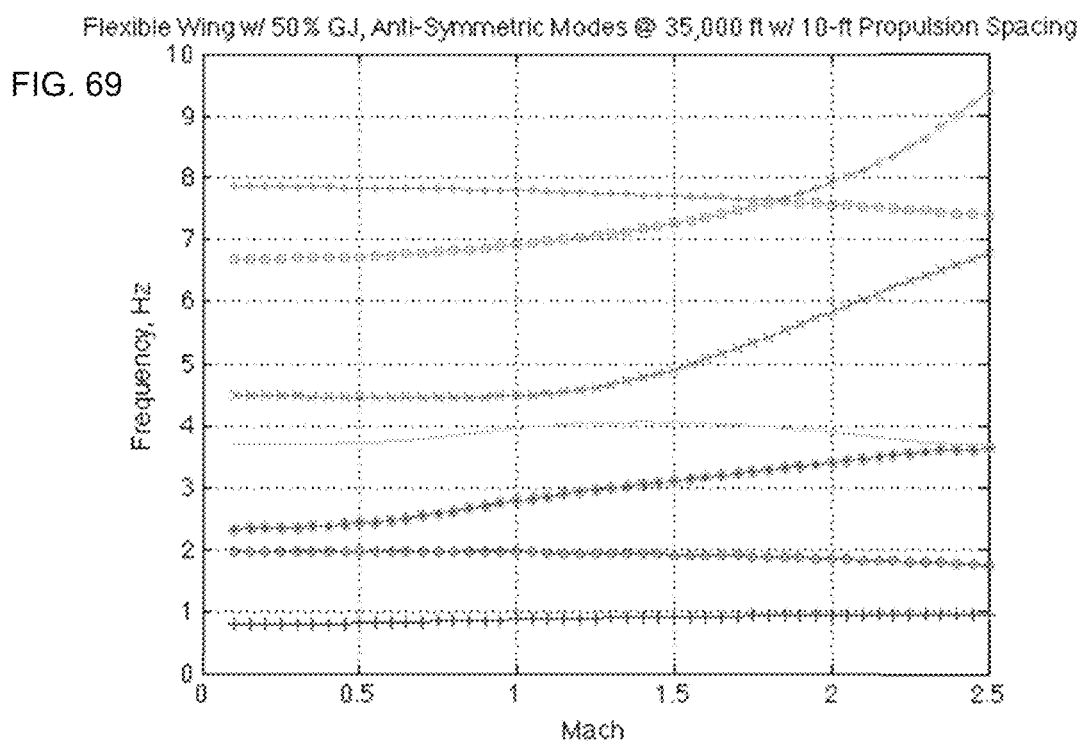
FIG. 69 is a plot of frequency and speed, for an aircraft of the disclosure having flexible wings and 10 foot propulsor spacing.
Figure 70:
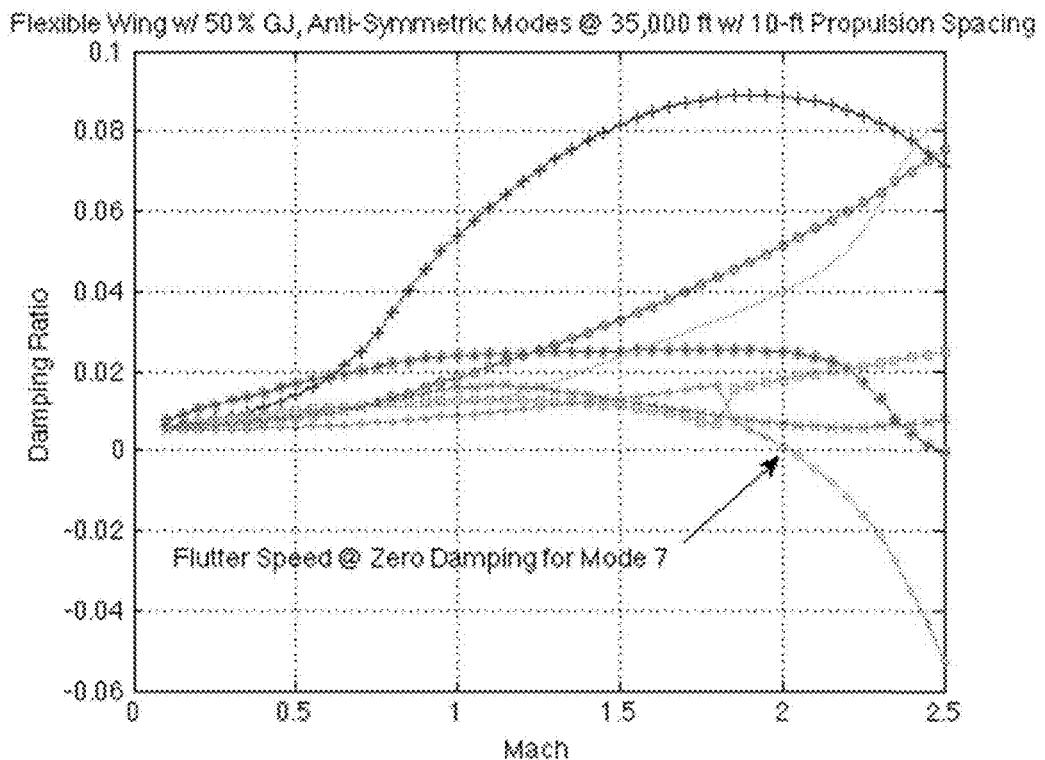
FIG. 70 is a plot of damping ratio and speed, for an aircraft of the disclosure having flexible wings and 10 foot propulsor spacing, for varying alternatives of thrust along the wing.

FIGS. 69-70 illustrate the intricate relationships between the aeroelastic frequency and damping as a function of airspeed due to dynamic aeroelasticity. Flutter occurs when bending and torsion modes interact together. The aerodynamic generalized force introduces an effective aerodynamic generalized mass, damping, and stiffness to the wing structure. As the airspeed increases, the generalized aerodynamic mass, damping, and stiffness change in an intricate manner as shown in FIG. 69. In general, flutter occurs when two aeroelastic modes coalesce in their aeroelastic frequencies as seen in FIG. 69. Accordingly, an energy exchange is taken place between the two interacting modes such that one mode extracts the energy from the other mode. Thus, one mode experiences an increase in its total energy while the other mode experiences a reduction in its total energy. The mode with the increased energy manifests itself in flutter as indicated by a negative damping such as mode 7 as shown in FIG. 70. Thus, the flutter mechanism in the flexible wing GTM configuration with a single generator is the coalescence of mode 6 and mode 7 as shown in FIG. 69. Flutter speed is defined as the airspeed at which the damping of a mode crosses zero from positive, which corresponds to a stable motion, to negative, which corresponds to an unstable motion. FIG. 70 illustrates the critical anti-symmetric flutter mode corresponds to mode 7 which flutters at Mach 2 for the flexible wing GTM configuration.

Figure 71:
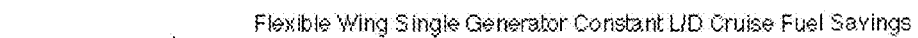
FIG. 71 is a plot of fuel reduction and range, for a flexible wing, single generator aircraft of the disclosure when cruising at a constant L/D.
Figure 72:
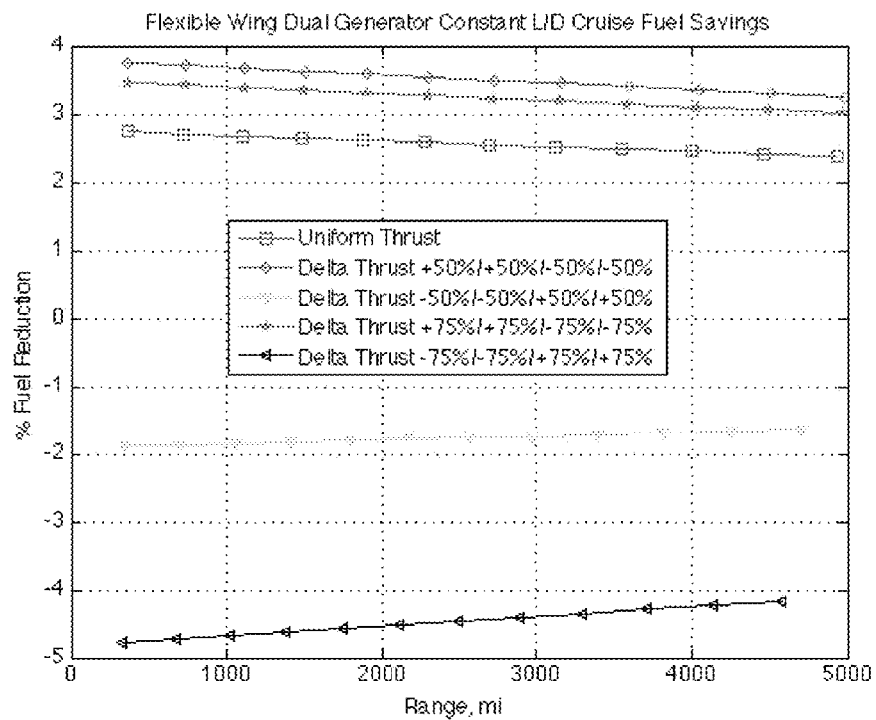
FIG. 72 is a plot as in FIG. 73, but for dual generators.

Results are summarized in FIGS. 71-72, comparing a flexible wing with a single generator, and a flexible wing with dual generators, for various thrust distributions along the wing span, when cruising at a constant L/D. The results show that a single generator is slightly more efficient, at least due to burning less fuel than a dual generator configuration. Further, by concentrating thrust more towards the outboard side of the wing produces the most improvement in L/D. The results further illustrate that almost 4% fuel reduction could be achieved in this configuration.

Figure 73:
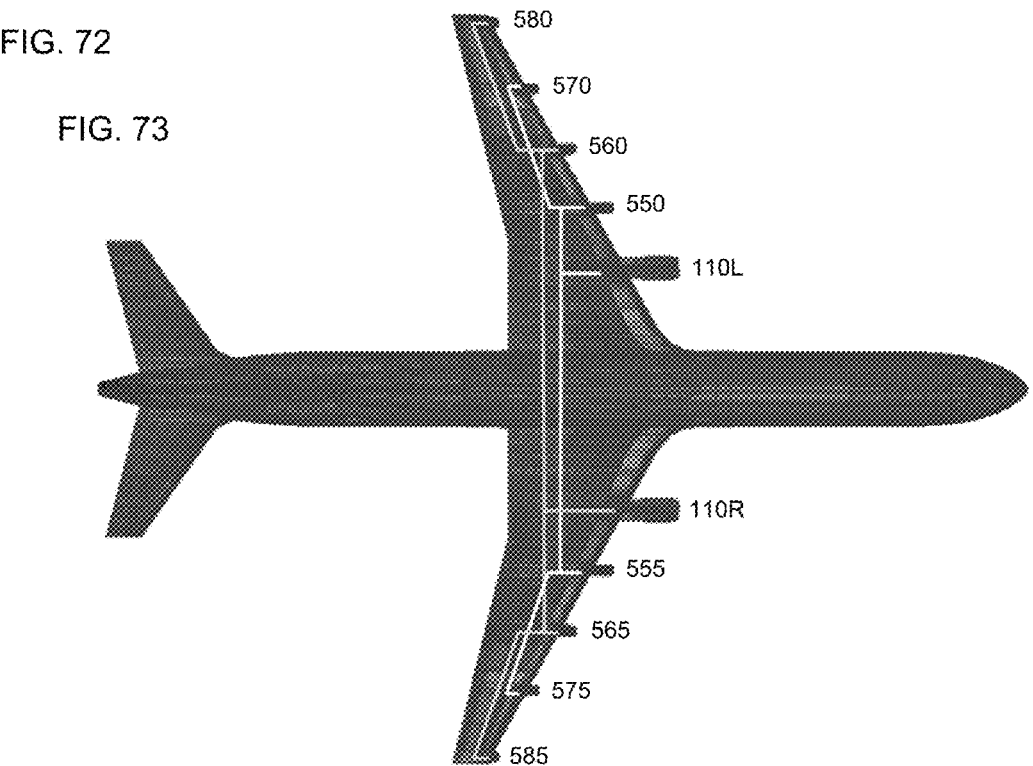
FIG. 73 illustrates a power distribution scheme of the disclosure for a configuration having a single generator per wing.

Distributed propulsion concepts can be designed to reduce or entirely eliminate the effect of thrust asymmetry in an engine-out event. FIG. 73 illustrates a power distribution scheme for the single generator configuration (FIG. 42). The propulsion devices are electrically powered by the generator on each wing. To minimize or eliminate asymmetric thrust due to loss of power, various embodiments for power distribution can be devised. One such embodiment is the power distribution shown in FIG. 73. Each of the generators 110L and 110R on the left and right wing, respectively, are configured to power a plurality of pairs of propulsion devices positioned symmetrically with respect to the aircraft fuselage centerline. In particular, the left generator 110L is configured to power the propulsion devices 550, 555, 570, and 575; and the right generator 110R is configured to power the propulsion devices 560, 565, 580, and 585. In an event of power loss to either the generator 110L or 110R, the aircraft with distributed propulsion 100 would not experience an asymmetric thrust as would be the case for a conventional aircraft. Many alternative embodiments for power distribution are possible, for example, the left generator 110L could also be configured to power the propulsion devices 550, 555, 560, and 565 or the propulsion devices 550, 555, 580, and 585. The flexibility and the ability to distribute power to a plurality of propulsion devices could afford an opportunity to reduce the vertical tail size for weight reduction which directly translates into drag reduction and fuel savings.

The foregoing will become more apparent in view of the following. The vertical tail provides the directional stability to an aircraft. It is normalized sized for the engine-out condition at the maximum take-off thrust. In conjunction, the rudder is designed to impart a yawing moment for directional control and yaw damping augmentation. In an event of power loss to one of the conventional gas turbine engine, the rudder can be deployed to counteract the yawing moment due to asymmetric thrust. With the power distribution as shown in FIG. 73, no yawing moment is created in an event of power loss to either the generator 110L or 110R. Thus, the vertical tail can be reduced in size to only provide the stability augmentation as needed for aircraft stability. As the vertical tail is reduced, the Dutch-roll damping also decreases accordingly. In order to maintain desired pilot handling qualities, yaw damping augmentation is usually implemented in the rudder control system to increase the Dutch-roll damping to a desired level. Thus, the rudder control system would need to be redesigned with increased actuator power to meet the Dutch-roll damping requirement. The disclosure provides opportunities to optimize the vertical tail size and the rudder control systems to achieve both objectives of reduced vertical tail size and Dutch-roll damping requirement. Such opportunities would directly translate into weight reduction in aircraft designs that employ distributed propulsion to achieve better fuel efficiency.

Figure 74:
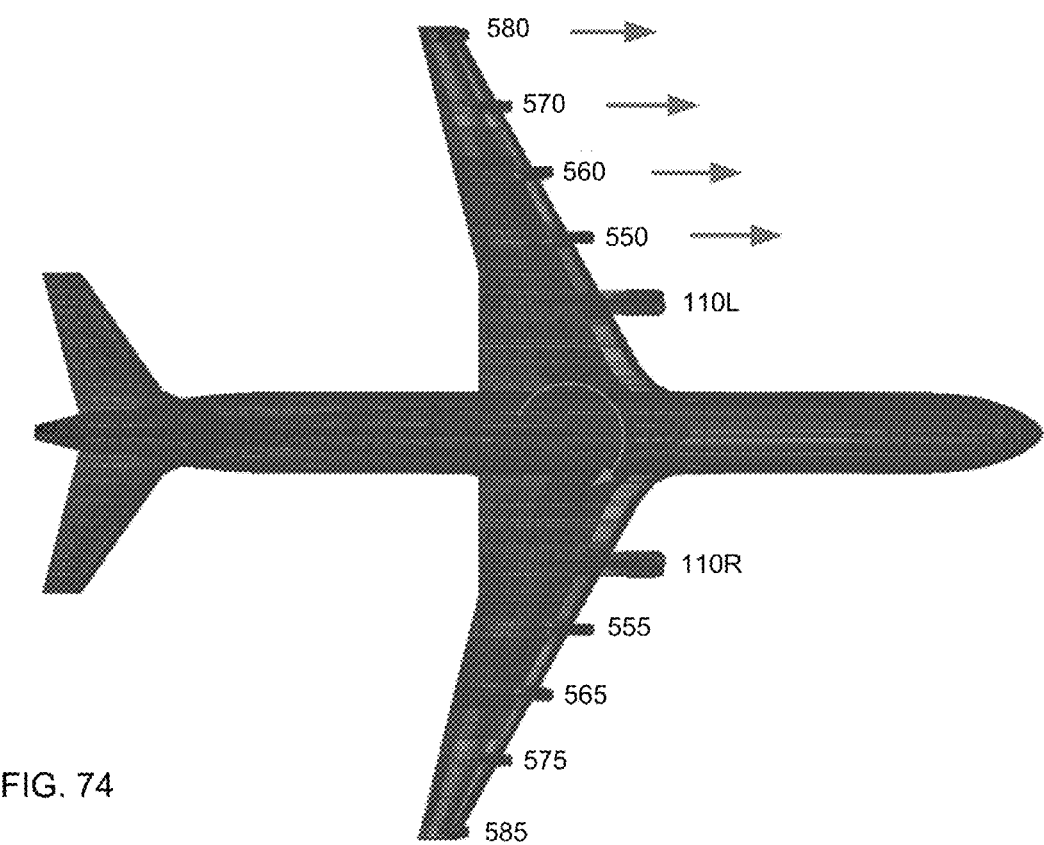
FIG. 74 illustrates asymmetric thrust yaw control in accordance with the disclosure.

Another benefit of distributed propulsion of the disclosure is the ability to deploy asymmetric thrust for yaw control. FIG. 74 illustrates the asymmetric thrust yaw control. The asymmetric thrust can be generated by either reducing the thrust level of the propulsion devices on one wing or increasing the thrust level of the propulsion devices on the other wing. The thrust distribution on one wing can either be uniform as shown in FIG. 74 or vary along the wing span. A flight control system can be designed to automatically generate suitable asymmetric thrust commands to the individual propulsion devices to generate a necessary yawing moment to yaw the aircraft 100 to the right. To yaw the aircraft 100 to the left, asymmetric thrust forces are created in a similar manner with the propulsion devices on the right wing producing more thrust than those on the left wing.

Figure 75:
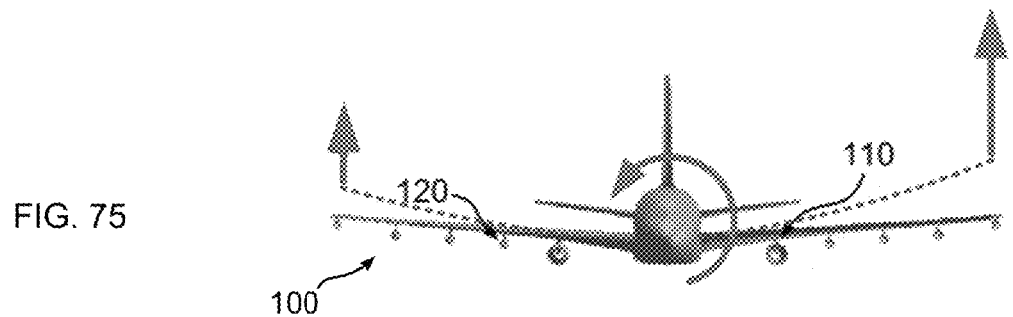
FIG. 75 illustrates asymmetric thrust to create unequal lift forces in accordance with the disclosure.
Figure 76:
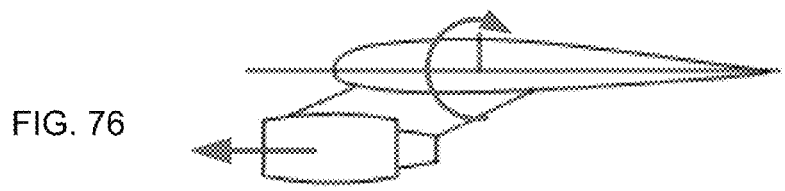
FIG. 76 illustrates asymmetric thrust forces acting to produce nose-up pitching moments, in accordance with the disclosure.

With reference to FIG. 75, the asymmetric thrust forces create unequal lift forces acting on the aircraft wings. Referring to FIG. 76, the thrust forces create nose-up pitching moments that twist the wing airfoil section nose-up in the direction of increasing angle of attack. Thus, thrust-induced lift forces are generated due to the thrust forces produced by the propulsion devices. Because the thrust forces from the propulsion devices 550, 560, 570, and 580 on the left wing are greater than those from the propulsion devices 555, 565, 575, and 585 on the right wing, the thrust-induced lift forces on the left wing are greater than those on the right wing. As a result, a rolling moment is produced from the unequal thrust-induced lift forces to roll the aircraft 100 to the right with the right wing up. The yawing moment thus creates an accompanied favorable rolling moment for the aircraft 100 to make a coordinated turn in which the aircraft 100 rolls into the direction of the turn as it yaws. This favorable rolling moment thus allows a coordinated turn to be controlled using only asymmetric thrust. In contrast, a coordinated turn maneuver in conventional aircraft requires both rudder and aileron inputs simultaneously. Furthermore, when rolling using ailerons, an adverse yaw is produced that tends to yaw the aircraft away from the turn, thus requiring extra rudder input to overcome adverse yaw. It can be seen that asymmetric thrust using distributed propulsion affords an advantage over the conventional flight control for coordinate turn maneuvers.

Pure roll control is also possible with the deployment of asymmetric thrust using distributed propulsion. A rudder input can be programmed automatically in a flight control system to cancel out the yawing moment produced by the asymmetric thrust, while the rolling moment due to the thrust-induced lift enables the aircraft 100 to perform pure roll. In contrast, a conventional aircraft performs pure roll by the application of an aileron input and a rudder input to cancel out the adverse yaw.

Pure yaw control is important in situations of landing in cross wind. Conventional aircraft performs pure yaw by the application of a rudder input and a small aileron input to maintain wing level due to the roll-yaw coupling. Pure yaw control is possible with asymmetric thrust using distributed propulsion. An aileron input is programmed in a flight control system to cancel out the rolling moment generated by thrust-induced lift forces.

Figure 77:
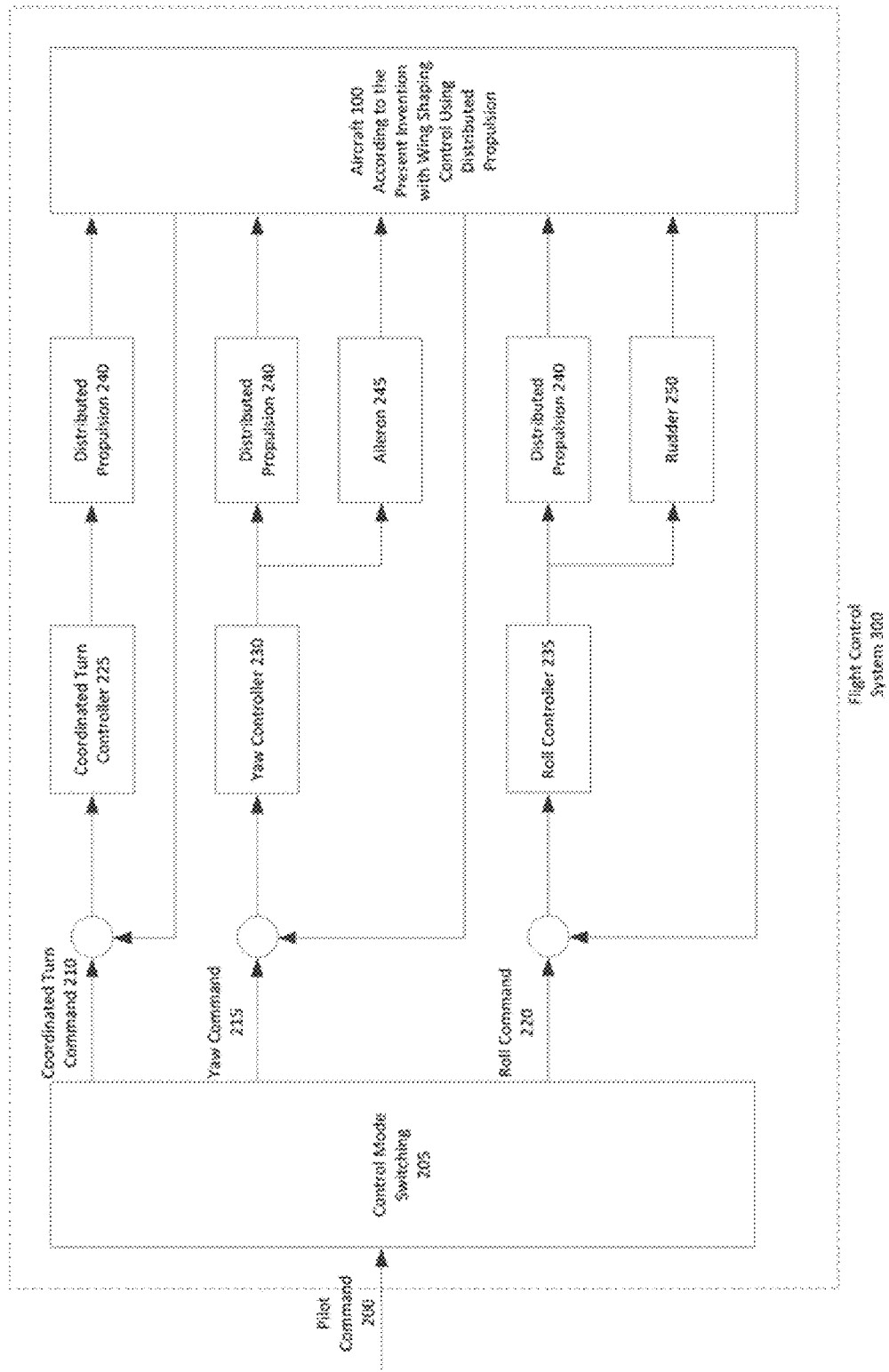
FIG. 77 is a block diagram of a flight control system of the disclosure.

The disclosure thus illustrates the ability to control the aircraft 100 with distributed propulsion using asymmetric thrust either alone or in coordination with either the rudder or ailerons. FIG. 77 illustrates a flight control system 300 for using asymmetric thrust to control roll and yaw motions of the aircraft 100. Flight control system can include one or more computer processors executing software configured to receive input from, for example, other processors, sensors, transmitted information, and input from flight crew, and which can control actuators and other devices which operate upon physical parameters of the aircraft, including moveable air deflection surfaces and propulsion device control interfaces. In an embodiment, flight control system 300 receives a pilot command 200 to initiate a coordinated turn, a pure yaw, or a pure roll. A control mode switching process 205 selects a desired controller to achieve a coordinated turn command 210, yaw command 215, or roll command 220. Each of the control modes is accomplished as follows:

The coordinate turn command 210 is used as the input into a coordinated turn controller 225 to generate the necessary command of asymmetric thrust for distributed propulsion 240. The output asymmetric thrust causes the aircraft 100 to change its motion. The response of the aircraft 100 is then fed back into the coordinated turn controller 225 to zero out the error to achieve the desired coordinated turn.

The yaw command 215 is used as the input into a yaw controller 230. Two command signals are generated by the yaw controller 230: an asymmetric thrust command for distributed propulsion 240, and an aileron command for the aileron 245. The asymmetric thrust and the aileron deflection causes the aircraft 100 to yaw while keeping the aircraft 100 wing level. The response of the aircraft 100 is fed back into the yaw controller 230 to achieve the desired yaw motion.

The roll command 220 is used as the input into the roll controller 235. An asymmetric thrust command and a rudder command are generated by the roll controller 235. These commands are received by distributed propulsion 240 and the rudder 250 which generate asymmetric thrust and rudder deflection to cause the aircraft 100 to roll without yaw. The response of the aircraft 100 is fed back into the roll controller 235 to achieve the desired roll motion.

In accordance with the present invention, the flight controller 300 is designed using the following equation that represents the lateral-directional dynamics of the aircraft 100. Note that the thrust-induced rolling moment term $L_{\delta_T}$ is due to thrust-induced lift, which is created by the aero-propulsive-elasticity effect of the flexible wing.

$$\begin{bmatrix} \Delta\dot{\beta} \\ \Delta\dot{p} \\ \Delta\dot{r} \\ \Delta\dot{\phi} \\ \Delta\dot{\psi} \end{bmatrix} = \begin{bmatrix} \frac{Y_\beta}{u} & \frac{Y_p}{u}+\overline{\alpha} & \frac{Y_r}{u}-1 & \frac{g}{u} & 0 \\ L_\beta & L_p & L_r & 0 & 0 \\ N_\beta & N_p & N_r & 0 & 0 \\ 0 & 1 & 0 & 0 & 0 \\ 0 & 0 & 1 & 0 & 0 \end{bmatrix} \begin{bmatrix} \Delta\beta \\ \Delta p \\ \Delta r \\ \Delta\phi \\ \Delta\psi \end{bmatrix} + \begin{bmatrix} \frac{Y_{\delta_T}}{u} & \frac{Y_{\delta_a}}{u} & \frac{Y_{\delta_r}}{u} \\ L_{\delta_T} & L_{\delta_a} & L_{\delta_r} \\ N_{\delta_T} & N_{\delta_a} & N_{\delta_r} \\ 0 & 0 & 0 \\ 0 & 0 & 0 \end{bmatrix} \begin{bmatrix} \delta_T \\ \delta_a \\ \delta_r \end{bmatrix}$$

The disclosure enables a reduction of the use of fuel during flight of aircraft having a plurality of independently controllable propulsion devices on each wing. Additionally, a flexible wing can be twisted, bent, or otherwise reshaped by a unique application of thrust by any of the various motors mounted to a particular wing. Fuel is saved by changing a profile of the wings using this thrust distribution and wing flexibility to optimize L/D for a particular task of the wing, during takeoff, cruising, and landing. Additionally, by varying total thrust of propulsion devices on each wing, and by varying thrust of individual propulsion devices on each wing, rudder functionality can be replaced or supplemented, and control can be restored or established in the event of symmetric or asymmetric motor failure. Additionally, a functionality of control surfaces used exclusively or primarily during takeoff and landing can be replaced by a plurality of propulsion devices and flexible wings for weight savings. Additionally, the angle of attack during takeoff can produce a reduced lift due to wing aeroelastic deflections. By changing the shape of portions of the wing, this reduced lift can be restored.

Example Computer System

Figure 78:
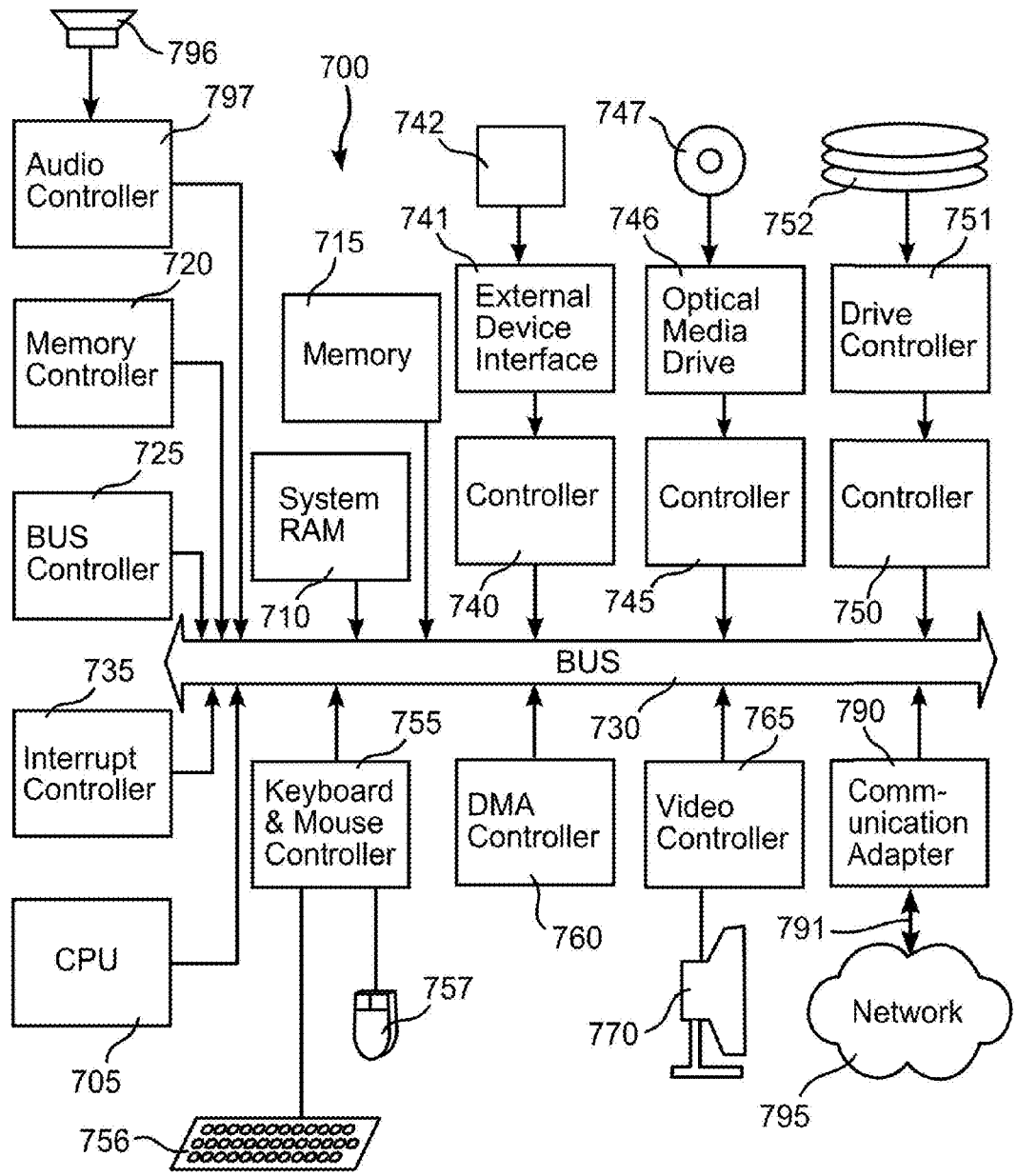
FIG. 78 is an illustrative computer system, part or all of which can be used to carry out various aspects of the disclosure, including the flight control system of FIG. 77.

FIG. 78 illustrates a system architecture for a computer system 700 which can process data on the aircraft, in accordance with the disclosure. All or only portions of such system can be used, as needed. The exemplary computer system of FIG. 78 is for descriptive purposes only. Although the description may refer to terms commonly used in describing particular computer systems, the description and concepts equally apply to other systems, including systems having architectures dissimilar to FIG. 78. System 700 can be an embedded system.

Computer system 700 includes at least one central processing unit (CPU) 705, or server, which may be implemented with a conventional microprocessor, a random access memory (RAM) 710 for temporary storage of information, and a read only memory (ROM) 715 for permanent storage of information. A memory controller 720 is provided for controlling RAM 710.

A bus 730 interconnects the components of computer system 700. A bus controller 725 is provided for controlling bus 730. An interrupt controller 735 is used for receiving and processing various interrupt signals from the system components.

Mass storage may be provided by diskette 742, CD or DVD ROM 747, flash or rotating hard disk drive 752. Data and software may be exchanged with computer system 700 via removable media such as diskette 742 and CD ROM 747. Diskette 742 is insertable into diskette drive 741 which is, in turn, connected to bus 730 by a controller 740. Similarly, CD ROM 747 is insertable into CD ROM drive 746 which is, in turn, connected to bus 730 by controller 745. Hard disk 752 is part of a fixed disk drive 751 which is connected to bus 730 by controller 750. It should be understood that other storage, peripheral, and computer processing means may be developed in the future, which may advantageously be used with the disclosure.

User input to computer system 700 may be provided by a number of devices. For example, a keyboard 756 and mouse 757 are connected to bus 730 by controller 755. An audio transducer 796, which may act as both a microphone and a speaker, is connected to bus 730 by audio controller 797, as illustrated. It will be obvious to those reasonably skilled in the art that other input devices, such as a pen and/or tablet, Personal Digital Assistant (PDA), mobile/cellular phone and other devices, may be connected to bus 730 and an appropriate controller and software, as required. DMA controller 760 is provided for performing direct memory access to RAM 710. A visual display is generated by video controller 765 which controls video display 770. Computer system 700 also includes a communications adapter 790 which allows the system to be interconnected to a local area network (LAN) or a wide area network (WAN), schematically illustrated by bus 791 and network 795.

Operation of computer system 700 is generally controlled and coordinated by operating system software, such as *nix, or a Windows system, commercially available from Microsoft Corp., Redmond, Wash. The operating system controls allocation of system resources and performs tasks such as processing scheduling, memory management, networking, and I/O services, among other things. In particular, an operating system resident in system memory and running on CPU 705 coordinates the operation of the other elements of computer system 700. The present disclosure may be implemented with any number of commercially available operating systems, including supercomputers and massively parallel processing systems.

One or more applications, such as an HTML page server, or a commercially available communication application, may execute under the control of the operating system, operable to convey information to a user.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

The invention claimed is:

1. An aircraft, comprising:
   at least two wings, each wing configured to twist during flight along a portion of the length of the wing;
   at least one inboard propulsion engine connected to each wing, located at some distance along the wing span;
   at least one outboard propulsion engine connected to each wing, located at some distance along the wing span, the at least one outboard propulsion engine positioned closer to a wing tip of the wing to which it is connected than the at least one inboard propulsion engine; and
   a controller configured to independently control thrust of the at least one outboard propulsion engine and the at least one inboard propulsion engine, including controlling thrust of the at least one outboard propulsion engine to produce the twist to thereby significantly change flight dynamics of the aircraft while maintaining aeroelastic stability.

2. The aircraft of claim 1, wherein the at least one inboard propulsion engine and the at least one outboard propulsion engine are positioned in the chordwise direction relative to the wing airfoil of each wing.

3. The aircraft of claim 1, wherein the at least one inboard propulsion engine and the at least one outboard propulsion engine are positioned on at least one of the upper, lower, or both surfaces of each wing.

4. The aircraft of claim 1, wherein the controller is configured to independently control thrust of the at least one inboard propulsion engine and the at least one outboard propulsion engine, to change a yaw angle of the aircraft while maintaining lift of the aircraft.

5. The aircraft of claim 4, wherein the controller is configured to independently control thrust of each of the at least one inboard propulsion engine and each of the at least one outboard propulsion engine for each wing, to thereby control flight dynamics of the aircraft in the event of failure of at least one inboard or outboard propulsion engine.

6. The aircraft of claim 1, wherein the controller is configured to independently control thrust of the at least one outboard propulsion engine and the at least one inboard propulsion engine to thereby twist and change the shape of the wings to improve a lift-to-drag ratio during at least one of takeoff, cruise, and landing of the aircraft while maintaining aeroelastic stability.

7. The aircraft of claim 1, wherein the at least one inboard propulsion engine and the at least one outboard propulsion engine include at least four propulsion engines.

8. The aircraft of claim 1, wherein the at least one inboard propulsion engine and the at least one outboard propulsion engine are electric fan engines.

9. The aircraft of claim 8, wherein the aircraft further includes at least one electricity generator configured to generate electricity to operate the electric fan engines.

10. The aircraft of claim 1, wherein at least one of the at least one outboard propulsion engine is located closer to the wing tip than the wing root.

11. The aircraft of claim 1, wherein at least one of the at least one inboard propulsion engine or the at least one outboard propulsion engine is an electric fan engine.

12. The aircraft of claim 11, wherein an electrical system of the aircraft includes a battery configured to provide electricity to the electric fan engine.

13. The aircraft of claim 1, further including at least one propulsion engine proximate a tip of the wing forming a winglet operative to reduce wing tip vortices for drag reduction, the at least one propulsion engine located closer to the wing tip than the wing root.

14. The aircraft of claim 1, further including at least one propulsion engine configured to impart a lateral thrust force to create bending moment to change the shape of the wings to improve a lift-to-drag ratio during at least one of takeoff, cruise, and landing of the aircraft while maintaining aeroelastic stability.

15. The aircraft of claim 1, further including at least one propulsion engine and a thrust vector flap positioned directly behind the propulsion engine to generate the vertical lift component to change the wing bending shape.

16. A method of changing flight dynamics during flight of an aircraft, comprising:
providing an aircraft having:
at least one inboard propulsion engine connected to each wing;
at least one outboard propulsion engine connected to each wing, the at least one outboard propulsion engine positioned closer to a wing tip of the wing to which it is connected than the at least one inboard propulsion engine;
two wings each configured to twist during flight along a portion of a length of each wing using the at least one outboard propulsion engine; and
a controller configured to independently control thrust of the at least one outboard propulsion engine and the at least one inboard propulsion engine, including controlling thrust of at least the at least one outboard propulsion engine to cause the twist during flight;
adjusting, with the controller, a thrust level of at least one of the at least one inboard propulsion engine and the at least one outboard propulsion engine to cause wing twist during flight.

17. The method of claim 16, wherein twisting is carried out by the controller by applying more thrust to the at least one outboard propulsion engine compared to thrust of the at least one inboard propulsion engine.

18. The method of claim 16, further including configuring the controller for distributing power to reduce or eliminate asymmetric thrust due to power loss, the controller reducing or eliminating asymmetric thrust by adjusting a thrust level of an operational propulsion engine of the at least one inboard propulsion engine and the at least one outboard propulsion engine.

19. The method of claim 16, further including configuring the controller for carrying out a coordinated turn control using asymmetric thrust only, the controller carrying out a coordinated turn by adjusting a thrust level of at least one of the at least one inboard propulsion engine and the at least one outboard propulsion engine.

20. The method of claim 16, further including using the controller to control yaw by adjusting a thrust level of at least one of the at least one inboard propulsion engine and the at least one outboard propulsion engine in coordination with controlling aileron positioning.

\* \* \* \* \*